US012073732B2

(12) United States Patent
Oi et al.

(10) Patent No.: US 12,073,732 B2
(45) Date of Patent: Aug. 27, 2024

(54) ACTION CONTROL DEVICE AND ACTION CONTROL METHOD, AND PROGRAM

(71) Applicant: Sony Group Corporation, Tokyo (JP)

(72) Inventors: Kenichiro Oi, Tokyo (JP); Masaki Handa, Tokyo (JP); Takuto Motoyama, Tokyo (JP); Shun Lee, Tokyo (JP); Masahiko Toyoshi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 434 days.

(21) Appl. No.: 17/434,014

(22) PCT Filed: Feb. 21, 2020

(86) PCT No.: PCT/JP2020/006992
§ 371 (c)(1),
(2) Date: Aug. 26, 2021

(87) PCT Pub. No.: WO2020/179491
PCT Pub. Date: Sep. 10, 2020

(65) Prior Publication Data
US 2022/0157179 A1    May 19, 2022

(30) Foreign Application Priority Data
Mar. 6, 2019  (JP) ................................ 2019-040139

(51) Int. Cl.
*G08G 5/00* (2006.01)
*G05D 1/00* (2006.01)
(52) U.S. Cl.
CPC .......... *G08G 5/0069* (2013.01); *G05D 1/101* (2013.01); *G08G 5/0017* (2013.01)

(58) Field of Classification Search
CPC .. G08G 5/0069; G08G 5/0017; G08G 5/0039; G08G 5/0052; G08G 5/045; G05D 1/101; G01C 21/20; G01C 23/00
(Continued)

(56) References Cited

U.S. PATENT DOCUMENTS 6,876,906 B1 * 4/2005 Zellers ................... G01C 23/00
701/3
9,121,711 B2 * 9/2015 Tidd ....................... G01S 5/0263
(Continued)

FOREIGN PATENT DOCUMENTS

| CN | 103238041 A | 8/2013 |
| CN | 104603821 A | 5/2015 |

(Continued)

OTHER PUBLICATIONS

International Search Report and Written Opinion mailed on May 19, 2020, received for PCT Application PCT/JP2020/006992, Filed on Feb. 21, 2020, 8 pages including English Translation.
(Continued)

*Primary Examiner* — Isaac G Smith
(74) *Attorney, Agent, or Firm* — XSENSUS LLP

(57) ABSTRACT

The present disclosure relates to action control device and an action control method and a program that enable more appropriate action control to be achieved.
An EKF processing unit selects a self-position estimation unit used to estimate a position of a drone from a plurality of the self-position estimation units which is different in estimation accuracy on the basis of waypoints that are indexes when the drone acts, and obtains a state of the drone. Then, a navigator controls an action of the drone according to an action plan created in advance on the basis of the state
(Continued)

of the drone. The present technology can be applied to, for example, a mission flight control device that controls a mission flight of a drone.

16 Claims, 21 Drawing Sheets

(58) Field of Classification Search
USPC .............................................................. 701/3
See application file for complete search history.

(56) References Cited

U.S. PATENT DOCUMENTS

| | | | |
|---|---|---|---|
| 2003/0008619 A1* | 1/2003 | Werner | H04W 4/021 |
| | | | 455/67.11 |
| 2009/0198398 A1 | 8/2009 | Yamada | |
| 2017/0323129 A1* | 11/2017 | Davidson | G01C 21/28 |
| 2018/0066960 A1 | 3/2018 | Tateishi | |
| 2018/0275685 A1 | 9/2018 | Kim | |
| 2019/0050000 A1 | 2/2019 | Kennedy et al. | |

FOREIGN PATENT DOCUMENTS

| | | |
|---|---|---|
| CN | 106061836 A | 10/2016 |
| CN | 106796112 A | 5/2017 |
| CN | 107289948 A | 10/2017 |
| CN | 107290765 A | 10/2017 |
| CN | 108137074 A | 6/2018 |
| CN | 108885461 A | 11/2018 |
| JP | 2014002103 A | 1/2014 |
| JP | 2015-522797 A | 8/2015 |
| JP | 2015152991 A | 8/2015 |
| JP | 2016-82441 A | 5/2016 |
| JP | 6289750 B1 | 3/2018 |
| JP | 2018160760 A | 10/2018 |

OTHER PUBLICATIONS

Zan Ynu-Long et al., "Target Position Estimation Aided Swarm Robotic Search under Conditions of Absolute Localization Mechanism", ENgineering Technology of Internet of Things Research Centerm Computer Science and Technology School, Apr. 15, 2013, pp. 321-327.

* cited by examiner

FIG. 5
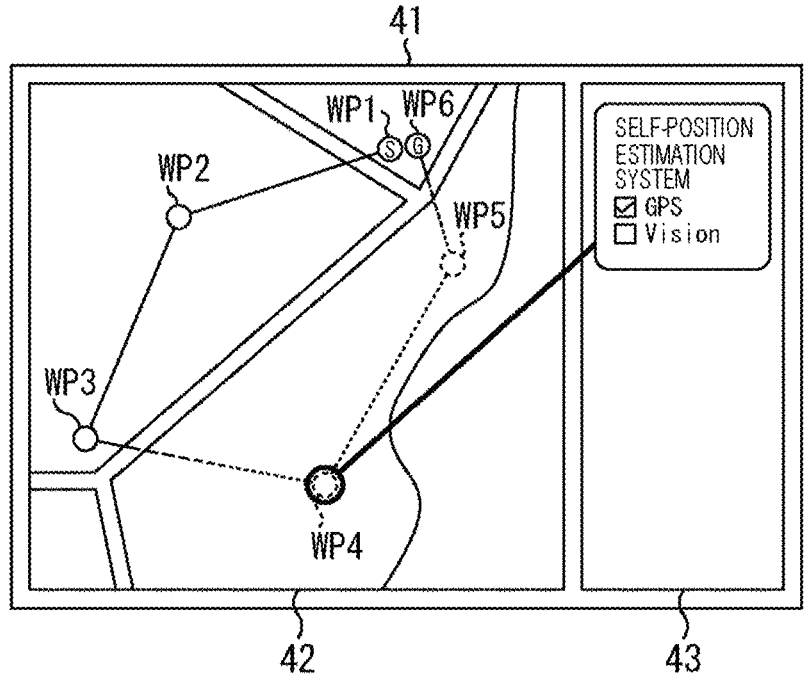
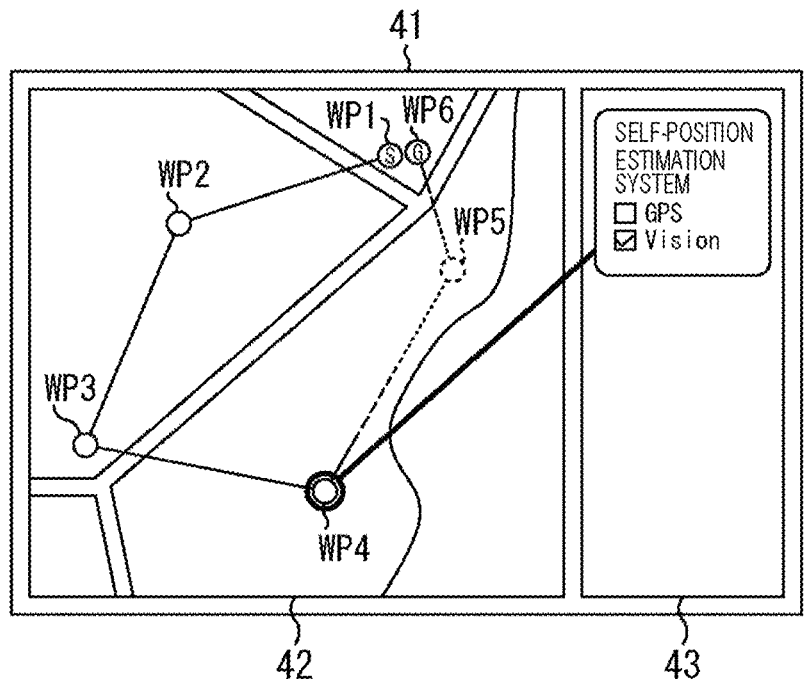

ACTION CONTROL DEVICE AND ACTION CONTROL METHOD, AND PROGRAM

CROSS-REFERENCE TO RELATED APPLICATIONS

The present application is based on PCT filing PCT/JP2020/006992, filed Feb. 21, 2020, which claims priority to JP 2019-040139, filed Mar. 6, 2019, the entire contents of each are incorporated herein by reference.

TECHNICAL FIELD

The present disclosure relates to an action control device and an action control method and a program, and relates particularly to an action control device and an action control method and a program that enable more appropriate action control to be achieved.

BACKGROUND ART

Conventionally, mobile objects such as unmanned aerial vehicles (UAVs), which are referred to as so-called drones, can fly according to operation by the user, for example, and also fly according to a mission of passing a prespecified waypoint (hereinafter referred to as a mission flight) is possible.

In order to achieve such a mission flight, the drone needs to be equipped with a self-position estimation system for estimating its own position. For example, for the self-position estimation system, a method of estimating the self-position using a global positioning system (GPS) sensor, a method of estimating the self-position using a vision sensor, and the like are mainly used, and various other methods can also be used.

For example, the self-position estimation system using the GPS sensor has a merit that the GPS can be used in a wide range, but meanwhile has a demerit that the accuracy of estimating the self-position is low (for example, an error of about several meters). Furthermore, the self-position estimation system using the vision sensor has a merit that the accuracy of estimating the self-position is high (for example, an error of about several centimeters), but meanwhile has a demerit that the range in which the vision can be effectively used is narrow, and it is not possible to be used for a uniform appearance, a distant view, and the like.

Furthermore, Patent Document 1 discloses a mobile object capable of more accurately setting a moving route or range by acquiring a plurality of pieces of position information and setting information of a moving range.

CITATION LIST

Patent Document

Patent Document 1: Japanese Patent No. 6289750

SUMMARY OF THE INVENTION

Problems to be Solved by the Invention

Incidentally, for example, since the conventional drone is configured to use the same self-position estimation system through the entire mission flight, it has been difficult to perform appropriate flight control according to the situation while changing the estimation accuracy for when estimating the self-position. For example, it has not been achieved to carry out a mission flight so as to fly while estimating the self-position with high accuracy at a certain waypoint, and fly at a high speed even with low accuracy at another certain waypoint.

The present disclosure has been made in view of such circumstances, and makes it possible to achieve more appropriate action control.

Solutions to Problems

An action control device of one aspect of the present disclosure includes a state specification unit that selects, on the basis of indexes, a self-position estimation unit used to estimate a position of a mobile object from a plurality of the self-position estimation units which is different in estimation accuracy, and obtains a state of the mobile object, and an action control unit that controls an action of the mobile object according to an action plan created in advance on the basis of the state of the mobile object.

An action control method or program of one aspect of the present disclosure includes selecting, on the basis of indexes, a self-position estimation unit used to estimate a position of the mobile object from a plurality of the self-position estimation units which is different in estimation accuracy, and obtaining a state of the mobile object, and controlling an action of the mobile object according to an action plan created in advance on the basis of the state of the mobile object.

In one aspect of the present disclosure, a self-position estimation unit used to estimate a position of the mobile object is selected on the basis of indexes from a plurality of the self-position estimation units which is different in estimation accuracy, and a state of the mobile object is obtained, and an action of the mobile object according to an action plan created in advance is controlled on the basis of the state of the mobile object.

BRIEF DESCRIPTION OF DRAWINGS

FIG. 5 is a diagram describing switching of a self-position estimation system.

MODE FOR CARRYING OUT THE INVENTION

Hereinafter, specific embodiments to which the present technology is applied will be described in detail with reference to the drawings.

<Mission Flight>

A mission flight of a drone will be described with reference to FIG. 1.

Figure 1:
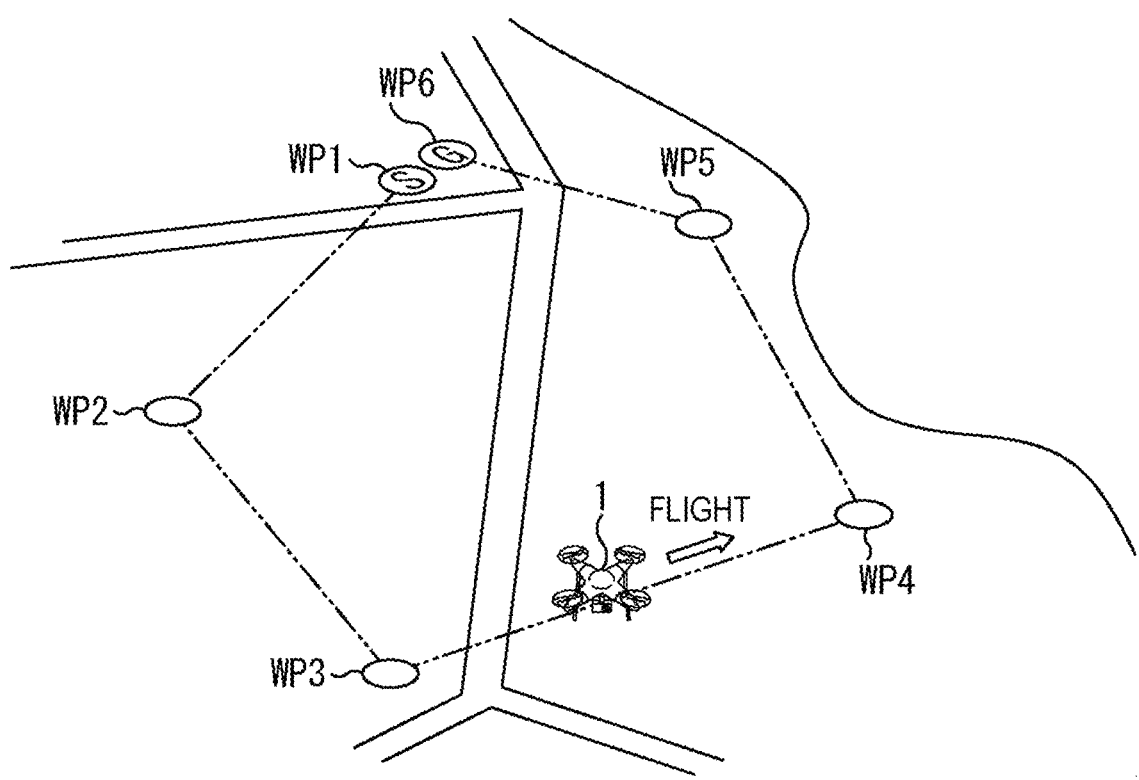
FIG. 1 is a diagram describing a mission flight.

For example, as illustrated in FIG. 1, in a case where six waypoints WP1 to WP6 are specified, an action plan is created in a route so as to pass the waypoints WP2 to WP5 in order from the waypoint WP1 as a start position to the waypoint WP6 as a goal position. In this case, the drone 1 can execute a mission flight that flies along the route illustrated by chain double dashed lines in FIG. 1.

Note that in the present embodiment, a mission flight using waypoints WP as indexes for when the drone 1 passes will be described, but in addition to using the waypoints WP, for example, an action task of the drone 1 (performing image capturing, transporting an article, or the like) may be specified to create an action plan. That is, it is not limited to that the user specifies the waypoints WP, and the waypoints WP may be specified according to the content of the action task. Note that the position of a waypoint WP can be specified, for example, on the basis of position information or area information acquired according to GPS when the drone 1 makes a preliminary flight.

<First Configuration Example of Mission Flight Control Device>

Figure 2:
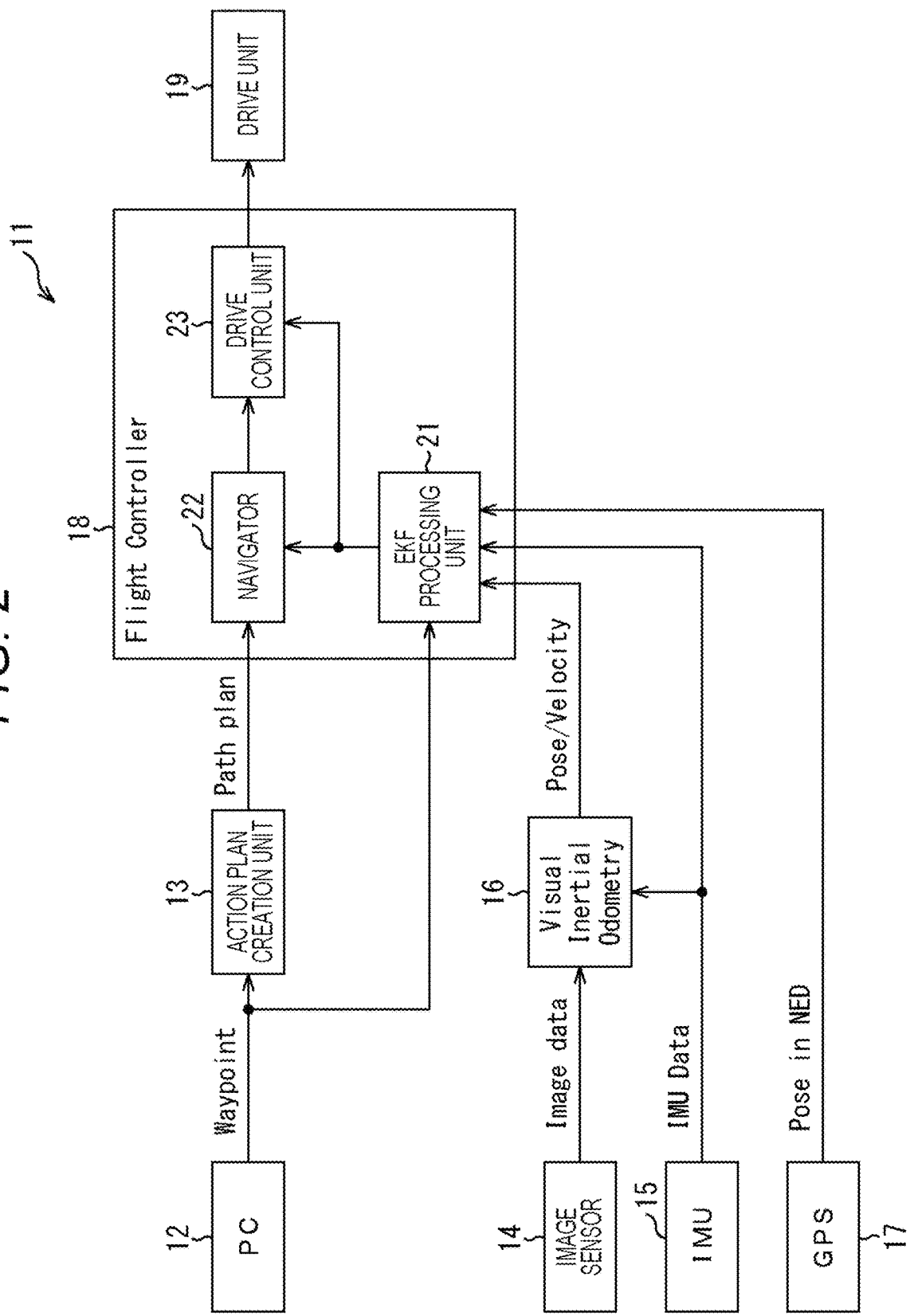
FIG. 2 is a block diagram illustrating a configuration example of a first embodiment of a mission flight control device to which the present technology is applied.

FIG. 2 is a block diagram illustrating a configuration example of the first embodiment of the mission flight control device to which the present technology is applied.

As illustrated in FIG. 2, the mission flight control device 11 includes a personal computer 12, an action plan creation unit 13, an image sensor 14, an inertial measurement unit 15, a Vision-based self-position estimation unit 16, a GPS-based self-position estimation unit 17, a flight control unit 18, and a drive unit 19. Furthermore, the flight control unit 18 includes an extended Kalman filter (EKF) processing unit 21, a navigator 22, and a drive control unit 23.

For example, the mission flight control device 11 can be configured so that the drone 1 in FIG. 1 incorporates the image sensor 14, the inertial measurement unit 15, the Vision-based self-position estimation unit 16, the GPS-based self-position estimation unit 17, the flight control unit 18, and the drive unit 19.

Figure 4:
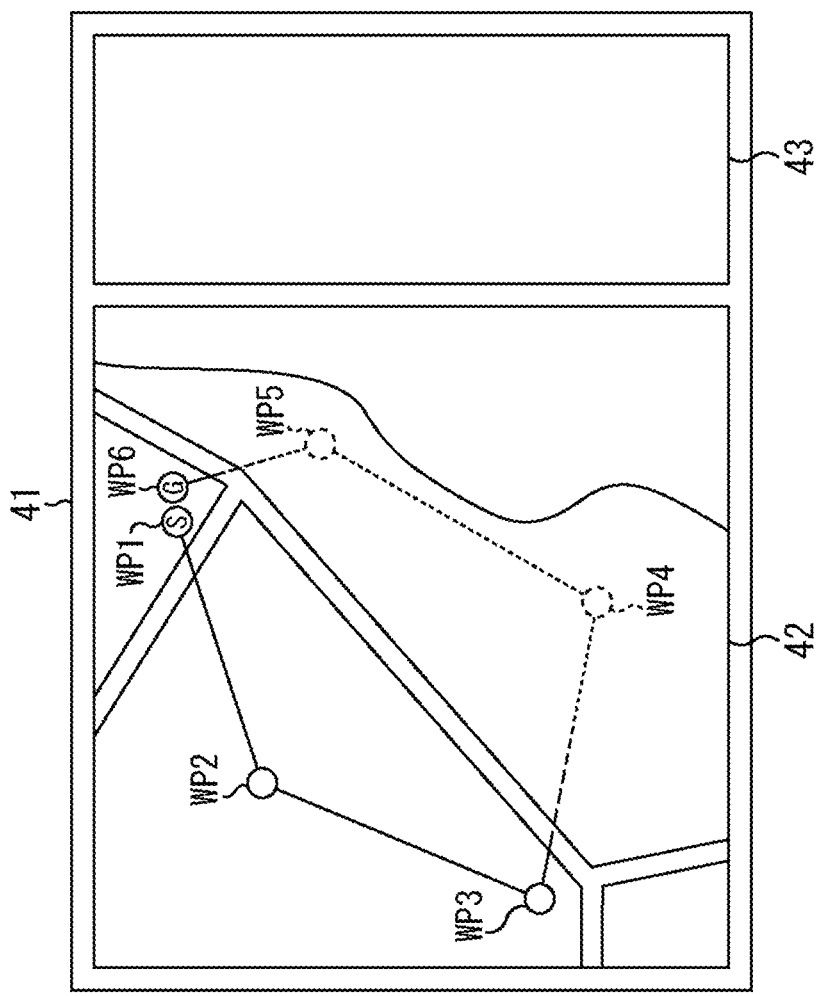
FIG. 4 is a diagram illustrating an example of a mission flight setting screen.

The personal computer 12 has, for example, a display unit that displays a mission flight setting screen 41 as illustrated in FIG. 4 described later, and an operation unit such as a mouse and a keyboard, and used by the user to specify a waypoint WP. Then, the personal computer 12 supplies the waypoint WP specified by the user to the action plan creation unit 13 and also to the EKF processing unit 21 of the flight control unit 18.

The action plan creation unit 13 creates an action plan (Path plan) for flying the drone 1 so as to pass the waypoint WP supplied from the personal computer 12, and supplies the action plan to the navigator 22 of the flight control unit 18.

The image sensor 14 has, for example, a solid state imaging element such as a charge coupled device (CCD) or a complementary metal oxide semiconductor (CMOS) image sensor. Then, the image sensor 14 supplies image data of an image obtained by imaging the periphery of the drone 1 with the solid state imaging element to the Vision-based self-position estimation unit 16.

The inertial measurement unit 15 is, for example, an inertial measurement unit (IMU) including a 3-axis gyro sensor or the like. Then, the inertial measurement unit 15 supplies acceleration and angular velocity measured along with the flight of the drone 1 to the Vision-based self-position estimation unit 16 as inertial measurement data (IMU data), and also supplies them to the EKF processing unit 21 of the flight control unit 18.

The Vision-based self-position estimation unit 16 uses the image data supplied from the image sensor 14 and the inertial measurement data supplied from the inertial measurement unit 15 to perform self-position estimation (Visual Inertial Odometry) to estimate the position of the drone 1. For example, simultaneous localization and mapping (SLAM) can be used for the Vision-based self-position estimation unit 16. Then, the Vision-based self-position estimation unit 16 uses the attitude and velocity (Pose/Velocity) obtained as a result of performing self-position estimation on the basis of the image data as Vision-based observation information to the EKF processing unit 21 of the flight control unit 18.

The GPS-based self-position estimation unit 17 performs, for example, self-position estimation for estimating the position of the drone 1 using GPS. Then, the GPS-based self-position estimation unit 17 supplies an attitude (Pose in NED) on NED (North-East-Down) coordinates obtained as a result of performing self-position estimation on the basis of the GPS as GPS-based observation information to the EKF processing unit 21 of the flight control unit 18.

The flight control unit 18 controls the drive unit 19 so that the drone 1 flies according to the action plan supplied from the action plan creation unit 13, and executes the flight control of the drone 1.

The drive unit 19 includes, for example, motors that drive a plurality of rotors, and causes the drone 1 to fly by thrust generated by these rotors.

The EKF processing unit 21 performs an EKF process to obtain the state (position and attitude) of the drone 1 on the basis of the inertial measurement data supplied from the inertial measurement unit 15, the Vision-based observation information supplied from the Vision-based self-position estimation unit 16, and the GPS-based observation information supplied from the GPS-based self-position estimation unit 17. Then, the EKF processing unit 21 supplies state information indicating the state of the drone 1 to the navigator 22 and the drive control unit 23 as an EKF process result obtained as a result of performing the EKF process. Note that a detailed configuration of the EKF processing unit 21 will be described later with reference to FIG. 2.

The navigator 22 gives necessary instructions for flying along the route from the state of the current drone 1 to the drive control unit 23 on the basis of the state information supplied from the EKF processing unit 21 so that the drone 1 flies according to the action plan supplied from the action plan creation unit 13.

The drive control unit 23 performs drive control (for example, position control and attitude control) on the drive unit 19 so as to cause the drone 1 to fly according to the instruction from the navigator 22 on the basis of the state information supplied from the EKF processing unit 21.

The mission flight control device 11 is configured as described above, and for example, when the user specifies the waypoint WP using the personal computer 12, the user can specify the self-position estimation system for each of the waypoints WP. That is, in the mission flight control device 11, the Vision-based self-position estimation unit 16 or the GPS-based self-position estimation unit 17 is specified as the self-position estimation system for each of the waypoints WP, and flight control using the observation information of either of them is performed. Note that the mission flight control device 11 may combine the observation information of both the Vision-based self-position estimation unit 16 and the GPS-based self-position estimation unit 17 for each of the waypoints WP, and may perform flight control by selectively using, for example, a plurality of pieces of observation information.

Therefore, in a case where the Vision-based self-position estimation unit 16 is specified as the self-position estimation system at the nearest neighbor waypoint WP, the EKF processing unit 21 selects the Vision-based observation information and performs the EKF process. On the other hand, in a case where the GPS-based self-position estimation unit 17 is specified as the self-position estimation system at the nearest neighbor waypoint WP, the EKF processing unit 21 selects the GPS-based observation information and performs the EKF process.

Figure 3:
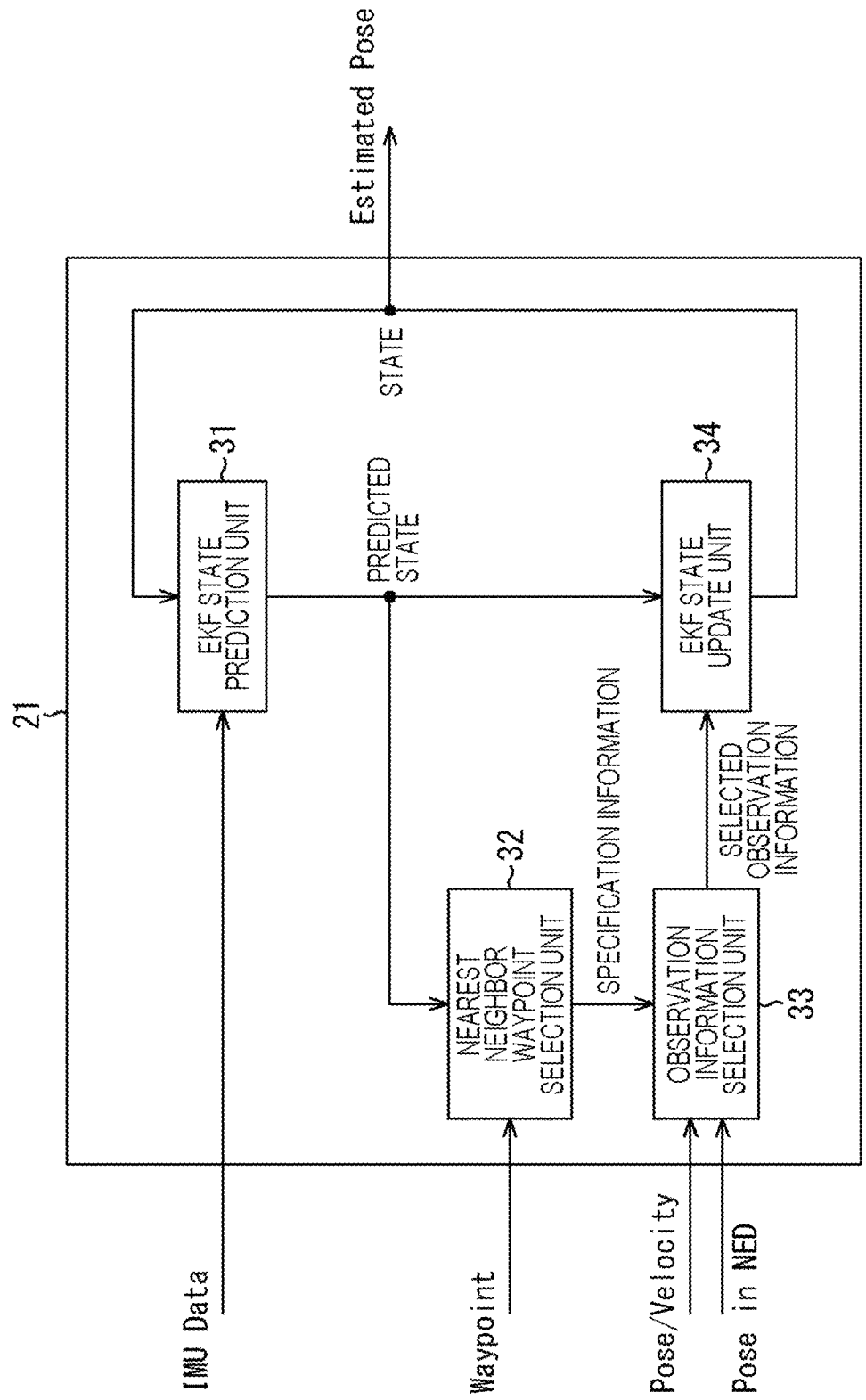
FIG. 3 is a diagram illustrating a configuration example of an EKF processing unit.

FIG. 3 is a block diagram illustrating a configuration example of the EKF processing unit 21.

As illustrated in FIG. 3, the EKF processing unit 21 includes an EKF state prediction unit 31, a nearest neighbor waypoint selection unit 32, an observation information selection unit 33, and an EKF state update unit 34.

The EKF state prediction unit 31 is supplied with the state information indicating the latest state of the drone 1, which is periodically output from the EKF processing unit 21, from the EKF state update unit 34. Then, from the latest state information, the EKF state prediction unit 31 predicts the state of the drone 1 at the timing of outputting the state information next on the basis of the inertial measurement data (IMU data) supplied from the inertial measurement unit 15 of FIG. 2. Then, the EKF state prediction unit 31 supplies predicted state information indicating the predicted state of the drone 1 to the nearest neighbor waypoint selection unit 32 and the EKF state update unit 34. For example, the predicted state information is a state variable of the EKF and includes the position and attitude of the drone 1, the bias value of the sensor of the inertial measurement unit 15, and the like.

The nearest neighbor waypoint selection unit 32 selects a nearest neighbor waypoint that is closest to the position of the drone 1 based on the predicted state information supplied from the EKF state prediction unit 31 from among a plurality of waypoints WP supplied from the personal computer 12. For example, the nearest neighbor waypoint selection unit 32 selects the waypoint WP having the shortest Euclidean distance in the NED coordinate system as the nearest neighbor waypoint. Then, the nearest neighbor waypoint selection unit 32 supplies the observation information selection unit 33 with specification information indicating which of the Vision-based self-position estimation unit 16 and the GPS-based self-position estimation unit 17 is specified as the self-position estimation system with respect to the nearest neighbor waypoint.

The observation information selection unit 33 selects either one of the Vision-based observation information (Pose/Velocity) supplied from the Vision-based self-position estimation unit 16 and the GPS-based observation information (Pose in NED) supplied from the GPS-based self-position estimation unit 17, according to the specification information supplied from the nearest neighbor waypoint selection unit 32. For example, in a case where the Vision-based self-position estimation unit 16 is specified as the self-position estimation system at the nearest neighbor waypoint, the observation information selection unit 33 selects the Vision-based observation information and supplies it to the EKF state update unit 34. On the other hand, in a case where the GPS-based self-position estimation unit 17 is specified as the self-position estimation system at the nearest neighbor waypoint, the observation information selection unit 33 selects the GPS-based observation information and supplies it to the EKF state update unit 34.

The EKF state update unit 34 updates the predicted state information supplied from the EKF state prediction unit 31 on the basis of the observation information selected by the observation information selection unit 33, and obtains the state of the drone 1 based on the latest observation information. For example, the EKF state update unit 34 updates the state of the drone 1 predicted by the EKF state prediction unit 31 so that it becomes more accurate according to the estimated position indicated in the observation information. Then, the EKF state update unit 34 outputs the state information indicating the state of the drone 1 as an EKF process result in the EKF processing unit 21, and supplies the state information to the EKF state prediction unit 31.

As described above, the EKF processing unit 21 can select the self-position estimation system at the nearest neighbor waypoint, and can obtain the state of the drone 1 with the estimation accuracy according to the situation at each of the waypoints WP.

Therefore, the mission flight control device 11 can perform the mission flight of the drone 1 by appropriate flight control according to the situation while changing the estimation accuracy when estimating the self-position at each of the waypoints WP.

Further, as in the present embodiment, in addition to the configuration in which any of the self-position estimation systems is specified for the nearest neighbor waypoint, for example, a configuration may be employed in which any of the self-position estimation systems is specified according to the position on the map, instead of the waypoint WP. Furthermore, it may be a configuration in which any of the self-position estimation systems is specified according to the area on the map.

Note that in the present embodiment, the Vision-based self-position estimation unit 16 and the GPS-based self-position estimation unit 17 are used as the self-position estimation systems, but it is not limited to the configuration using these two. For example, the mission flight control device 11 may be configured to use an altitude sensor, a geomagnetic sensor, and other self-position estimation systems (Ultra-Wide Band (UWB), wifi SLAM, OptiTrack, short-range wireless communication base, and the like) and switch and use them.

FIG. 4 is a diagram illustrating an example of a mission flight setting screen.

For example, a mission flight setting screen 41 is used to input various instructions necessary for performing a mission flight by using a graphical user interface (GUI) of the personal computer 12. As illustrated, the mission flight setting screen 41 includes a map display area 42 and an instruction GUI display area 43.

In the map display area 42, for example, a map of the area in which the drone 1 is flown is displayed. Then, when the user instructs waypoints WP1 to WP6 using the map displayed in the map display area 42, the waypoints WP1 to WP6 are displayed so as to be superimposed on the map.

At this time, the waypoints WP1 to WP6 are displayed so as to visualize the self-position estimation system specified for each of them. That is, in the example illustrated in FIG. 4, the waypoints WP1 to WP3 and WP6 are represented by solid lines, visualizing that the Vision-based self-position estimation unit 16 is specified as the self-position estimation system. Furthermore, the waypoints WP4 and WP5 are represented by broken lines, visualizing that the GPS-based self-position estimation unit 17 is specified as the self-position estimation system.

Furthermore, in the map display area 42, the routes connecting the waypoints WP1 to WP6 in order are also displayed so as to visualize the self-position estimation system used when the drone 1 flies on each of the routes.

For example, in the example illustrated in FIG. 4, the route connecting the waypoints WP1 to WP3 in which the Vision-based self-position estimation unit 16 is specified as the self-position estimation system is represented by a solid line, visualizing that the Vision-based self-position estimation unit 16 is used when the drone 1 flies along that route. Similarly, the route connecting the waypoints WP4 and WP5 for which the GPS-based self-position estimation unit 17 is specified as the self-position estimation system is represented by a broken line, visualizing that the GPS-based self-position estimation unit 17 is used when the drone 1 flies along that route.

Moreover, in the route connecting waypoints WP3 and WP4, switching from the Vision-based self-position estimation unit 16 to the GPS-based self-position estimation unit 17 to be used when the drone 1 flies on that route is visualized by changing from the solid line to a broken line. Similarly, in the route connecting waypoints WP5 and WP6, switching from the GPS-based self-position estimation unit 17 to the Vision-based self-position estimation unit 16 to be used when the drone 1 flies on that route is visualized by changing from the broken line to a solid line.

In the instruction GUI display area 43, a GUI used to give an instruction on the self-position estimation system for each of the waypoints WP is displayed, for example, as will be described later with reference to FIG. 5.

The switching of the self-position estimation system specified for the waypoint WP will be described with reference to FIG. 5. FIG. 5 illustrates an example of switching the self-position estimation system specified for the waypoint WP4 from the GPS-based self-position estimation unit 17 to the Vision-based self-position estimation unit 16.

As illustrated in the upper part of FIG. 5, if the waypoint WP4 as a target of switching the self-position estimation system is specified in the map display area 42, a check box for specifying the self-position estimation system is displayed in the instruction GUI display area 43. That is, a check box for specifying the GPS-based self-position estimation unit 17 and a check box for specifying the Vision-based self-position estimation unit 16 are displayed.

At this time, a check mark is displayed in the check box for specifying the GPS-based self-position estimation unit 17, visualizing that the GPS-based self-position estimation unit 17 is specified for the waypoint WP4.

Then, when the user operates on the check box for specifying the Vision-based self-position estimation unit 16, a check mark is displayed in the check box for specifying the Vision-based self-position estimation unit 16 as illustrated in the lower part of FIG. 5. Thus, in the map display area 42, the display of the waypoint WP4 changes from the broken line to a solid line. Moreover, the route connecting the waypoints WP3 and WP4 is represented by a solid line, and the route connecting the waypoints WP4 and WP5 is represented so as to change from the broken line to a solid line.

For example, in a case where it is desired to fly the drone 1 with higher accuracy at the place where the drone 1 has been flown with the estimation accuracy of the GPS-based self-position estimation unit 17, an operation is performed to switch the setting to the Vision-based self-position estimation unit 16. In this manner, the user can specify the self-position estimation system on the basis of the estimation accuracy required when passing through the waypoint WP.

<Mission Flight Control Process>

The mission flight control process executed by the mission flight control device 11 will be described with reference to a flowchart described in FIG. 6. Note that it is assumed that information necessary for performing a mission flight, for example, information such as a map and terrain of the area where the drone 1 is flown, is acquired by flying with low accuracy in advance.

In step S11, the user uses the personal computer 12 to specify a waypoint WP on the map displayed in the map display area 42 of the mission flight setting screen 41 illustrated in FIG. 4. In response to this, the personal computer 12 supplies the waypoint WP specified by the user to the action plan creation unit 13.

In step S12, the user uses the personal computer 12 and specifies the Vision-based self-position estimation unit 16 or the GPS-based self-position estimation unit 17 as the self-position estimation system for each of the waypoints WP specified in step S11. In response to this, the personal computer 12 supplies the self-position estimation system for each of the waypoints WP specified by the user to the EKF processing unit 21 of the flight control unit 18.

In step S13, the action plan creation unit 13 creates an action plan for the drone 1 so as to pass through the waypoint WP specified in step S11, and supplies the action plan to the navigator 22 of the flight control unit 18.

In step S14, when the user instructs the drone 1 to start the flight, the flight control unit 18 performs flight control in response to the instruction. Thus, the drone 1 flies toward the waypoint WP1 which is the start position illustrated in FIG. 1, for example, and starts the flight according to the action plan created in step S13.

In step S15, the Vision-based self-position estimation unit 16 estimates the position of the drone 1 on the basis of the image data supplied from the image sensor 14 and the inertial measurement data supplied from the inertial measurement unit 15, and acquires Vision-based observation information. Furthermore, the GPS-based self-position estimation unit 17 estimates the position of the drone 1 using GPS and acquires GPS-based observation information.

In step S16, the EKF processing unit 21 performs the EKF process to determine the state of the drone 1 on the basis of the inertial measurement data supplied from the inertial measurement unit 15, the Vision-based observation information supplied from the Vision-based self-position estimation unit 16, and the GPS-based observation information supplied from the GPS-based self-position estimation unit 17. Note that the EKF process will be described later with reference to FIG. 7.

In step S17, the flight control unit 18 performs flight control to cause the drone 1 to fly along the route. That is, the navigator 22 gives an instruction to the drive control unit 23 on the basis of the state information supplied from the EKF processing unit 21 so that the drone 1 flies according to the action plan created by the action plan creation unit 13 in step S13. Then, the drive control unit 23 performs drive control on the drive unit 19 so as to cause the drone 1 to fly according to the instruction from the navigator 22 on the basis of the state information supplied from the EKF processing unit 21.

In step S18, the navigator 22 determines, for example, whether or not the drone 1 has flown to the waypoint WP6, which is the goal position illustrated in FIG. 1.

In a case where the navigator 22 determines in step S18 that the drone 1 has not flown to the goal position, the process returns to step S15, and a similar process is repeated thereafter. On the other hand, in a case where the navigator 22 determines in step S18 that the drone 1 has flown to the goal position, the process proceeds to step S19.

In step S19, the flight control unit 18 performs flight control so that the drone 1 performs a predetermined operation accompanying the end of the flight, for example, hovering or the like, and then the mission flight control processing is terminated.

Figure 6:
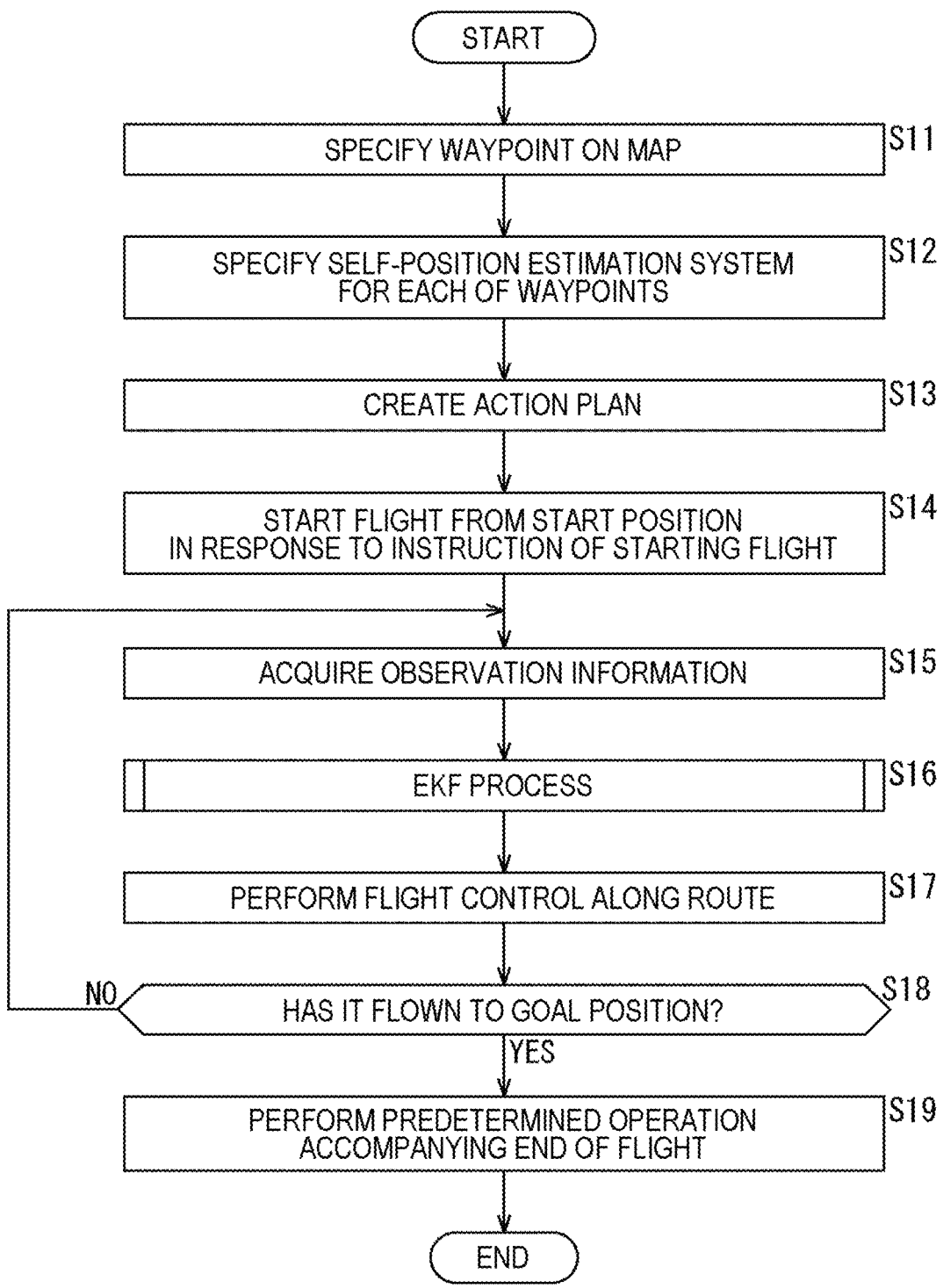
FIG. 6 is a flowchart describing a mission flight control process.
Figure 7:
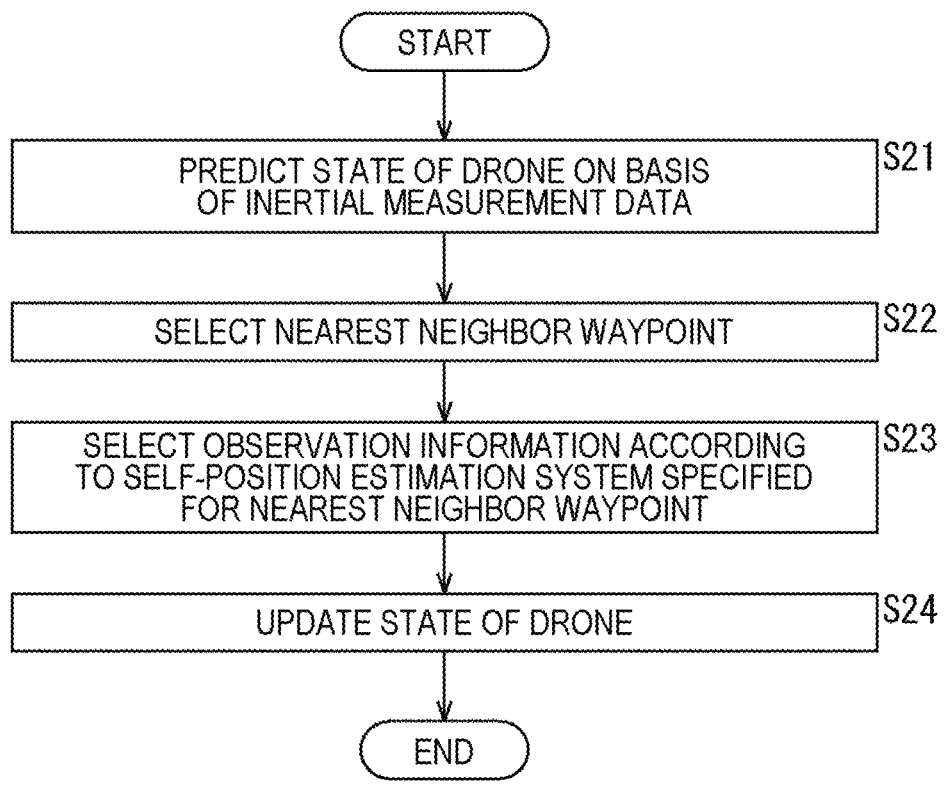
FIG. 7 is a flowchart describing an EKF process.

FIG. 7 is a flowchart describing the EKF processing performed in step S16 of FIG. 6.

In step S21, the EKF state prediction unit 31 predicts the state (position and attitude) of the drone 1 on the basis of the inertial measurement data supplied from the inertial measurement unit 15 of FIG. 2.

In step S22, the nearest neighbor waypoint selection unit 32 selects the nearest neighbor waypoint that is closest to the position of the drone 1 predicted by the EKF state prediction unit 31 in step S21. Then, the nearest neighbor waypoint selection unit 32 supplies the observation information selection unit 33 with specification information indicating the self-position estimation system specified for the nearest neighbor waypoint.

In step S23, the observation information selection unit 33 selects the observation information according to the specification information supplied from the nearest neighbor waypoint selection unit 32 in step S22, and supplies the observation information to the EKF state update unit 34. For example, the observation information selection unit 33 selects the Vision-based observation information in a case where the Vision-based self-position estimation unit 16 is specified as the self-position estimation system for the nearest neighbor waypoint, and selects the GPS-based observation information in a case where the GPS-based self-position estimation unit 17 is specified.

In step S24, the EKF state update unit 34 updates the state of the drone 1 predicted by the EKF state prediction unit 31 in step S21 on the basis of the observation information supplied from the observation information selection unit 33 in step S23. Then, after outputting the state information indicating the state of the drone 1, the EKF process is terminated.

By the mission flight control process and the EKF process as described above, the mission flight control device 11 can select the self-position estimation system for each of the waypoints WP, and achieve appropriate flight control of the drone 1 with the estimation accuracy thereof.

<Visualization of Information Required to Specify the Self-Position Estimation System>

Visualization of the information necessary for specifying the self-position estimation system will be described with reference to FIGS. 8 to 11.

Figure 8:
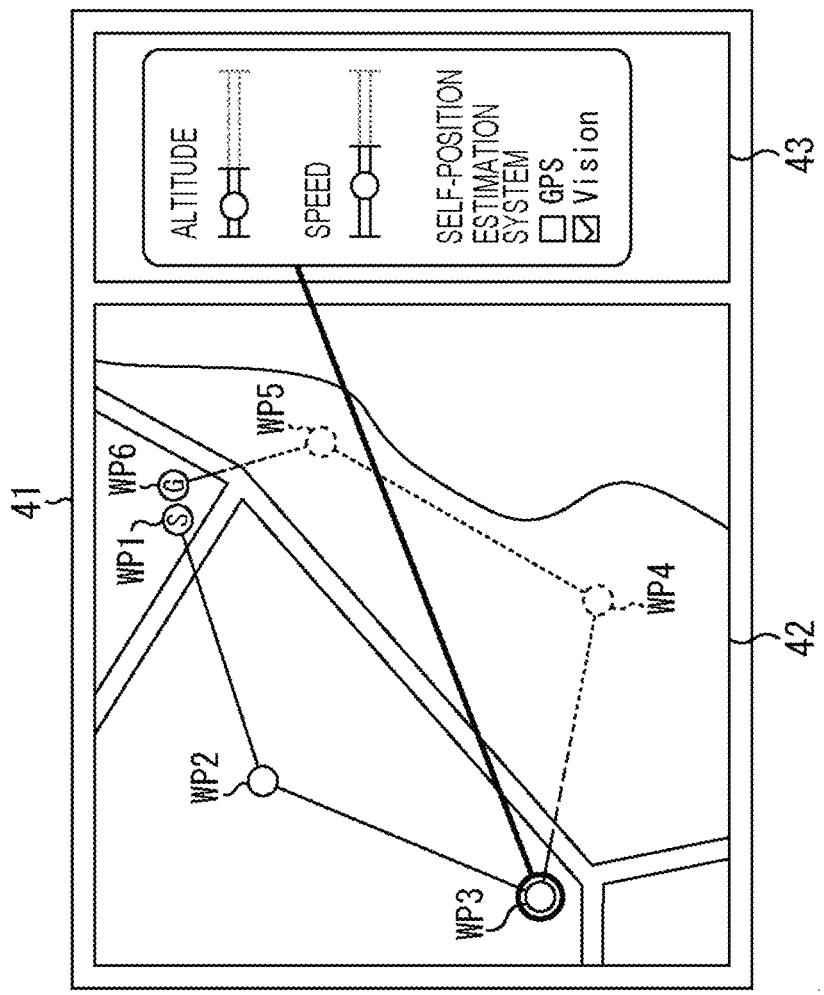
FIG. 8 is a diagram illustrating an example of a user interface that visualizes an effective range of altitude and speed.

FIG. 8 illustrates an example of a user interface that visualizes an effective range of altitude and speed.

For example, as illustrated in FIG. 8, when the Vision-based self-position estimation unit 16 is specified as the self-position estimation system at the waypoint WP3, the effective range of altitude and velocity is visualized and presented. That is, in a case where the Vision-based self-position estimation unit 16 is used, the altitude and speed at which the self-position can be estimated with predetermined accuracy or higher are determined in advance, and in the example illustrated in FIG. 8, ranges higher than the altitude and speed are grayed out.

This allows the user to determine whether to specify the Vision-based self-position estimation unit 16 as the self-position estimation system with reference to the effective ranges of the altitude and speed.

Figure 9:
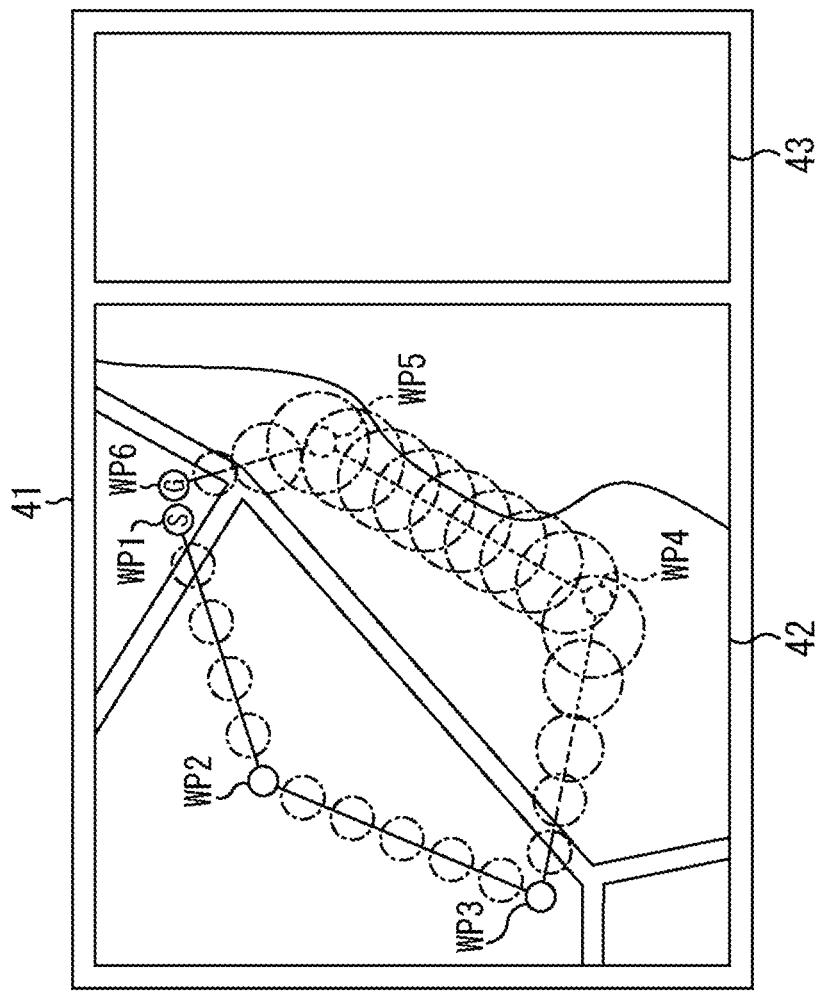
FIG. 9 is a diagram illustrating an example of a user interface that visualizes estimation accuracy.

FIG. 9 illustrates an example of a user interface that visualizes the estimation accuracy.

For example, as illustrated in FIG. 9, an error ellipse representing an error range based on accuracy of estimating the self-position is presented as a circle formed by an alternate long and short dash line. That is, the Vision-based self-position estimation unit 16 can estimate the self-position with high accuracy, and small circles indicating that the error range is small are displayed at regular intervals on the route using the Vision-based self-position estimation unit 16. On the other hand, the GPS-based self-position estimation unit 17 estimates the self-position with low accuracy, and large circles indicating that the error range is large are displayed at regular intervals on the route where the GPS-based self-position estimation unit 17 is used.

For example, the circle representing the error range can be specified by a constant from the specifications of the sensors used by the Vision-based self-position estimation unit 16 and the GPS-based self-position estimation unit 17, or can be specified by the user.

Thus, the user can easily grasp the estimation accuracy of the self-position estimation system used by the drone 1 along the route on the map, and for example, can check a margin with an obstacle.

Visualization of the self-position estimation system to be not selectable will be described with reference to FIGS. 10 and 11.

Figure 10:
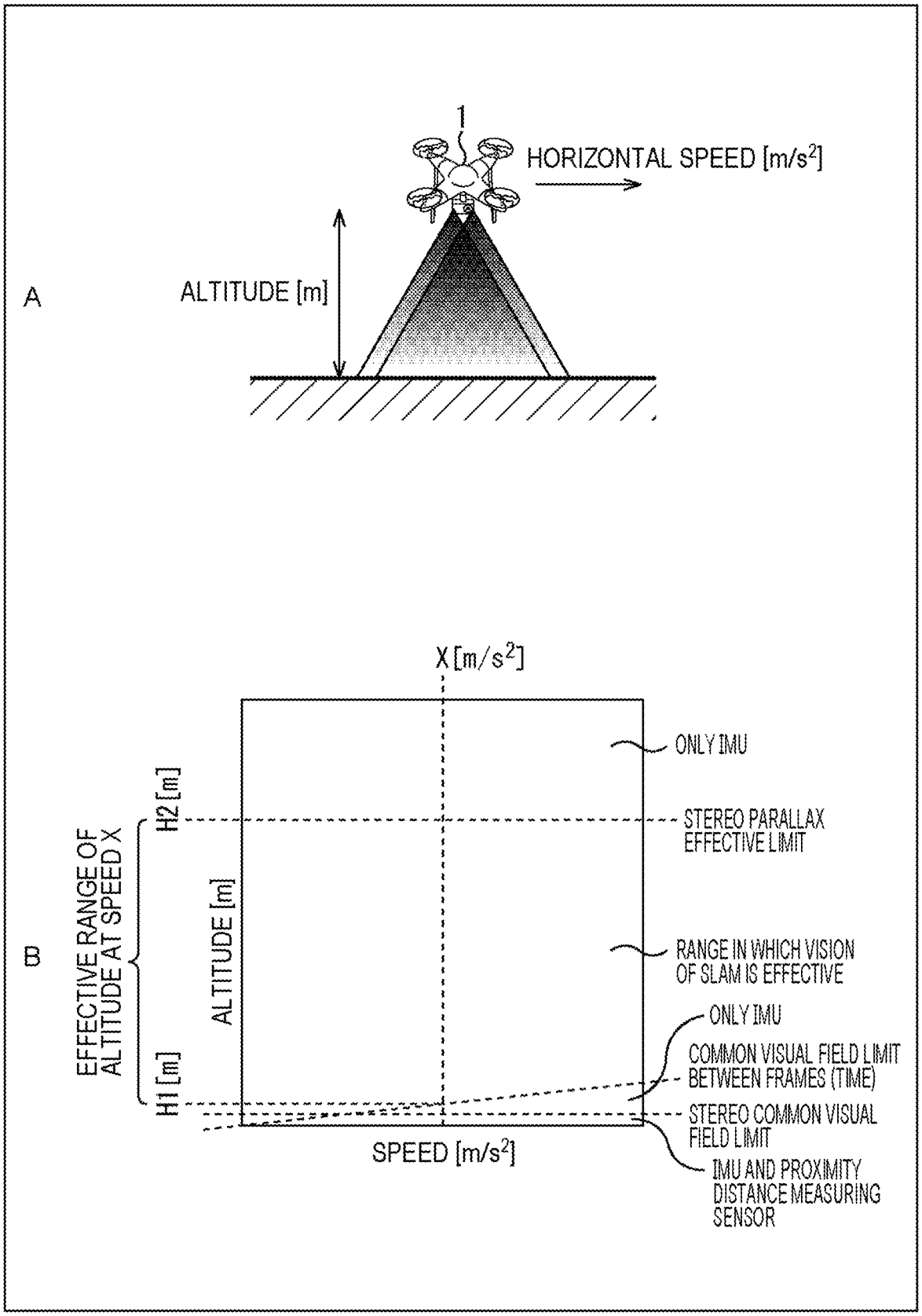
FIG. 10 is a diagram describing an effective range for altitude and speed for each self-position estimation system.

For example, as illustrated in FIG. 10, the effective range for the altitude and speed of the drone 1 is obtained for each of the self-position estimation systems.

That is, as illustrated at A of FIG. 10, in the Vision-based self-position estimation unit 16 that uses SLAM using a downward stereo camera in the drone 1, as illustrated at B of FIG. 10, it is obtained as a range in which the vision of SLAM is effective. That is, the altitude and speed that are equal to or less than a stereo parallax effective limit and equal to or more than a common visual field limit between frames (time) and a stereo common visual field limit are in a range in which the vision of SLAM is effective. Then, at an altitude higher than the stereo parallax effective limit and an altitude lower than the common visual field limit between frames (time), only the inertial measurement unit 15 is used. Moreover, at altitudes below the stereo common visual field limit, the inertial measurement unit 15 and proximity distance measuring sensor are used.

For example, in a case where the drone 1 flies at a speed of X [m/s$^2$], from H1 that is the common visual field limit between frames (time) to altitude H2 that is the stereo parallax effective limit is obtained as an effective range of altitude in which the Vision-based self-position estimation unit 16 can be used.

Therefore, the mission flight control device 11 can determine whether or not it is within the effective range of the Vision-based self-position estimation unit 16 on the basis of that the altitude and speed at the waypoint WP are specified. Then, for example, in a case where it is determined that the specified altitude and velocity are not within the effective range of the Vision-based self-position estimation unit 16, that is, in a case where it is outside the effective range of the Vision-based self-position estimation unit 16, selection of the Vision-based self-position estimation unit 16 is automatically disabled.

Figure 11:
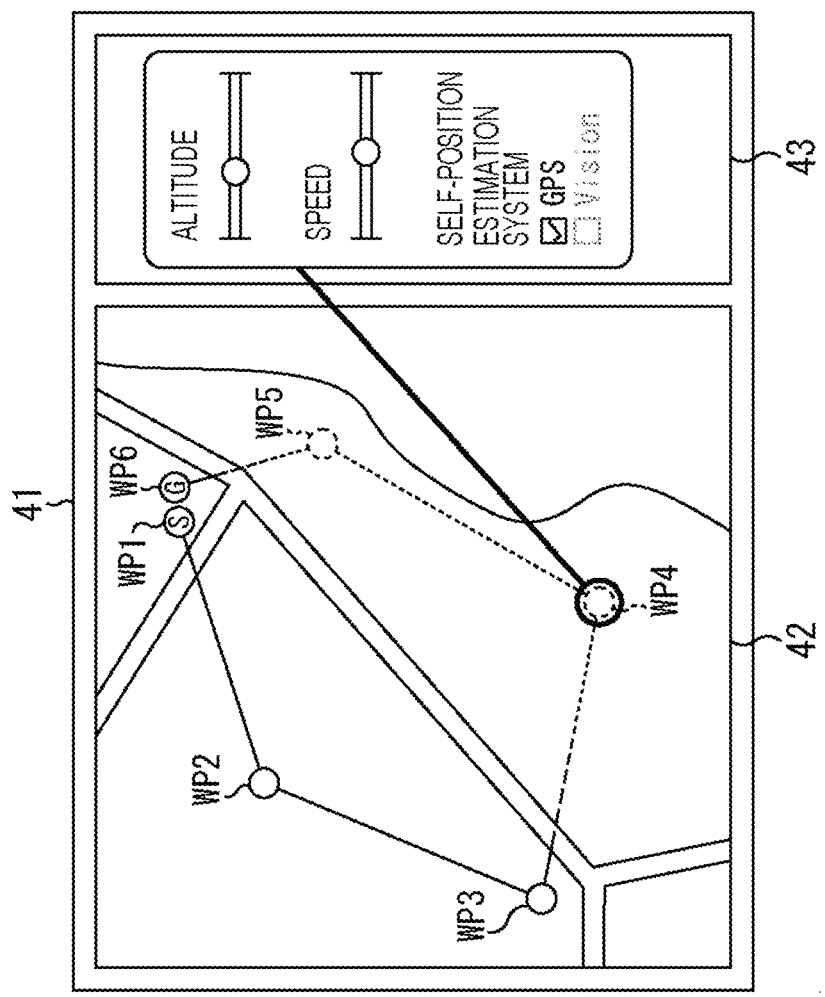
FIG. 11 is a diagram illustrating an example of a user interface that visualizes that Vision-based self-position estimation is not selectable.

Therefore, as illustrated in FIG. 11, in a case where the specified altitude and speed are outside the effective range of the Vision-based self-position estimation unit 16, the check box for selecting the Vision-based self-position estimation unit 16 in the instruction GUI display area 43 is grayed out. That is, it is visualized that the Vision-based self-position estimation unit 16 is not selectable.

Thus, the user can recognize the self-position estimation system that can be selected on the basis of the altitude and speed, and can easily select the self-position estimation system according to the situation.

<Automatic Setting Process Based on Indexes>

Figure 12:
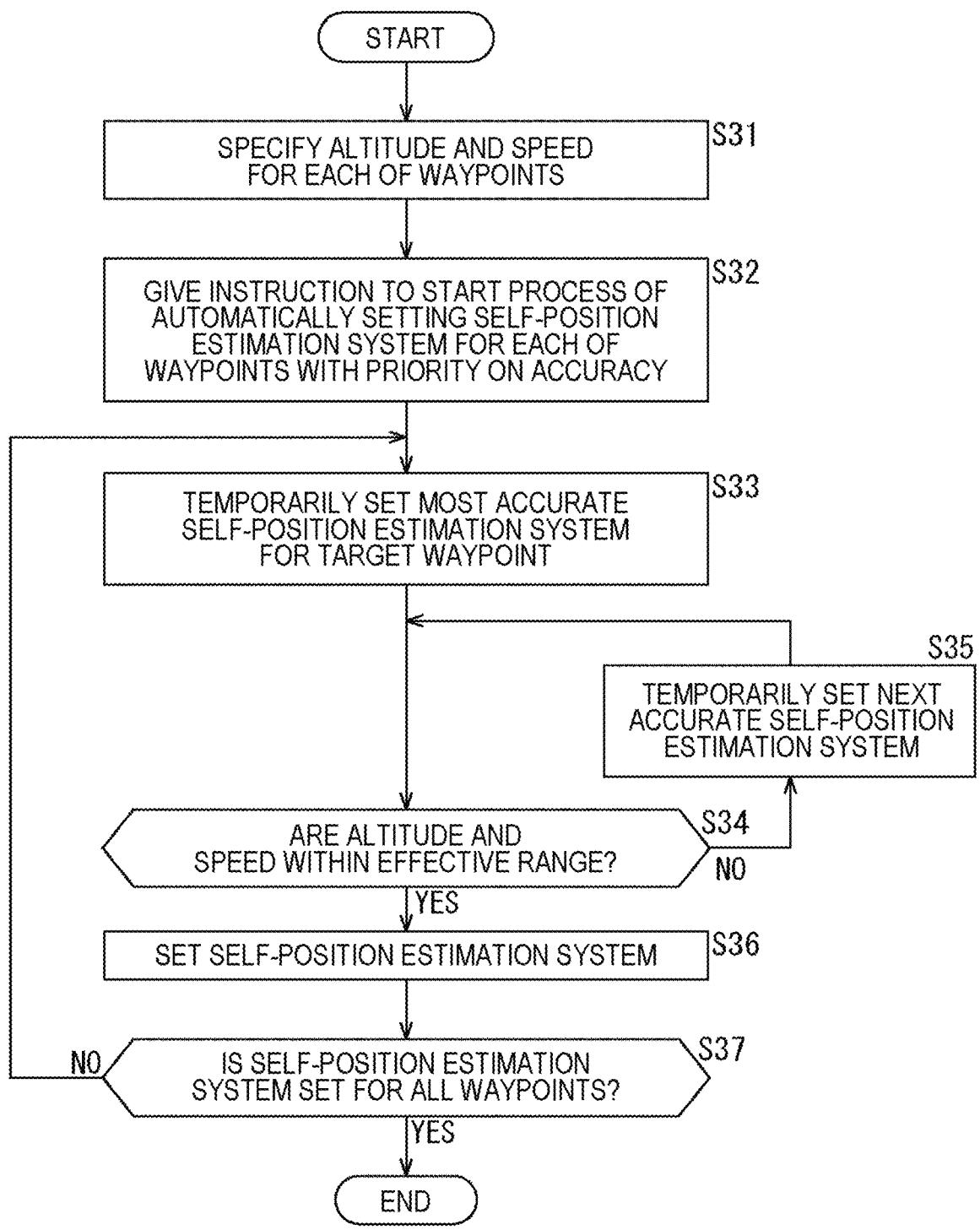
FIG. 12 is a flowchart describing a waypoint setting process for automatically selecting a waypoint WP with priority on high accuracy.
Figure 13:
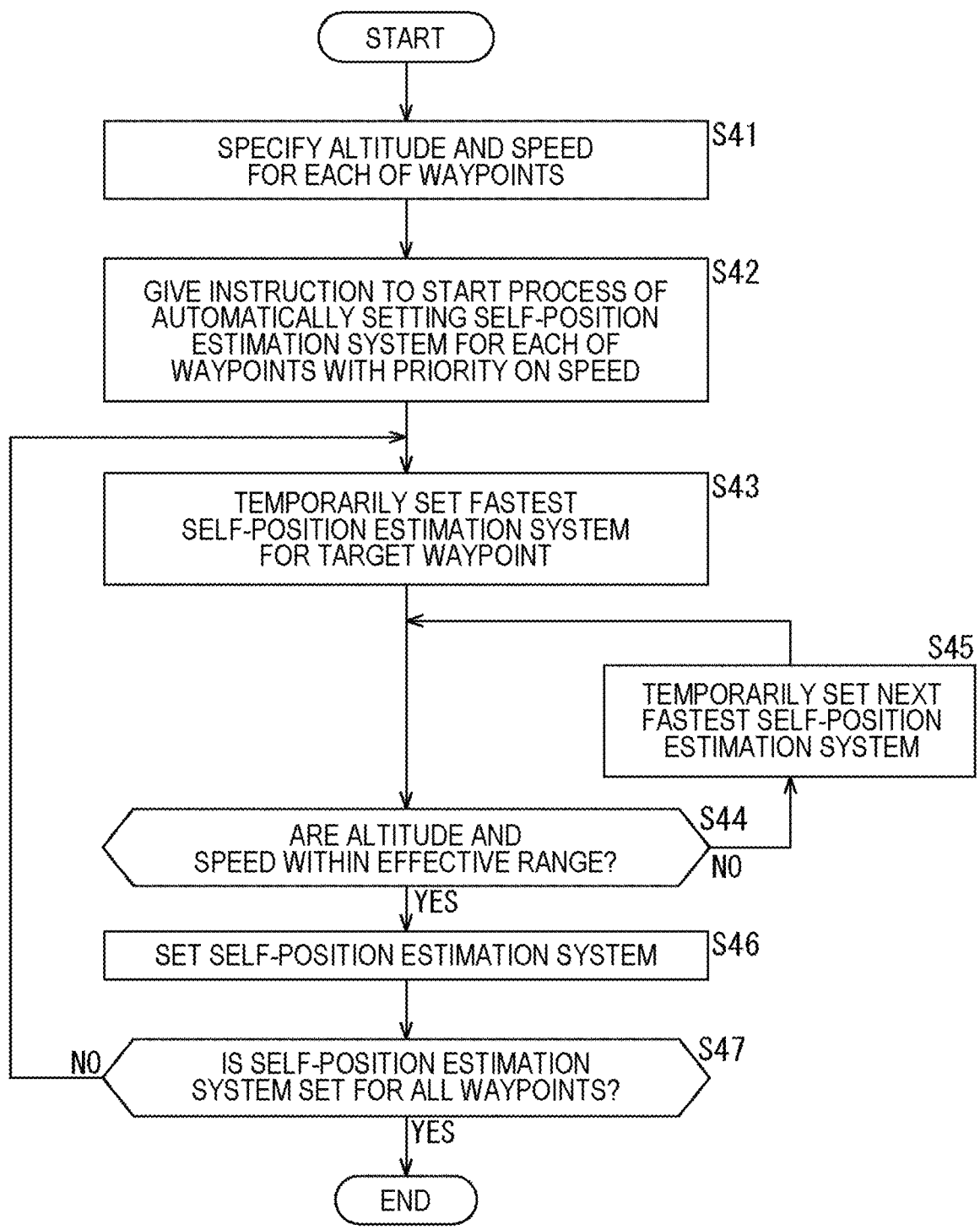
FIG. 13 is a flowchart describing a waypoint setting process for automatically selecting a waypoint WP with priority on speed.
Figure 14:
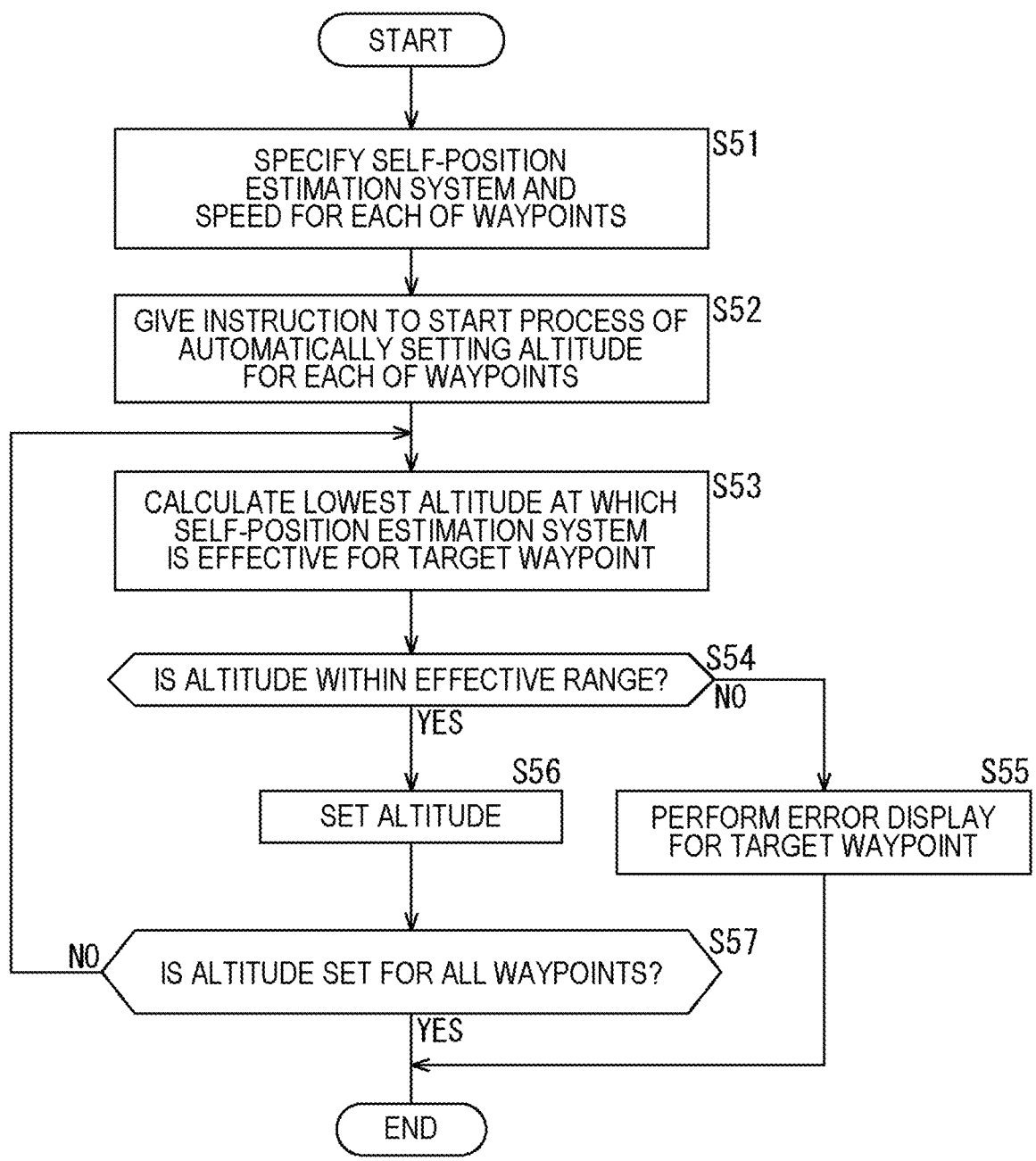
FIG. 14 is a flowchart describing a waypoint setting process for automatically selecting an altitude for each of waypoints WP according to speed and specification of the self-position estimation system.

With reference to FIGS. 12 to 14, an automatic setting process for automatically setting the self-position estimation system, altitude, and the like for each of the waypoints WP on the basis of priority will be described.

FIG. 12 is a flowchart describing a waypoint setting process for automatically selecting a waypoint WP with priority on high accuracy. For example, the waypoint setting process illustrated in FIG. 12 can be executed instead of step S12 in FIG. 6.

For example, after the processing of step S11 of FIG. 6, in step S31, the user uses the personal computer 12 and specifies the altitude and speed for each of the waypoints WP specified in step S11.

In step S32, the user uses the personal computer 12 and gives an instruction to start the process of automatically setting the self-position estimation system for each of the waypoints WP with priority on accuracy.

In step S33, for example, the personal computer 12 takes a target for setting the self-position estimation system in order from the waypoint WP that is the start position, and temporarily sets the most accurate self-position estimation system for the target waypoint WP.

In step S34, the personal computer 12 determines whether or not the altitude and speed specified in step S31 are within the effective range in which the currently temporarily set self-position estimation system can be used.

In a case where the personal computer 12 determines in step S34 that the altitude and speed are not within the effective range, that is, in a case where the altitude and speed are outside the effective range, the process proceeds to step S35.

In step S35, the personal computer 12 temporarily sets the next accurate self-position estimation system after the currently temporarily set self-position estimation system. Thereafter, the process returns to step S34, and a similar process is repeated thereafter.

On the other hand, in a case where it is determined in step S34 that the altitude and speed are within the effective range, the process proceeds to step S36.

In step S36, the personal computer 12 sets the currently temporarily set self-position estimation system for the target waypoint WP.

In step S37, the personal computer 12 determines whether or not the self-position estimation system has been set for all the waypoints WP specified in step S11 of FIG. 6 by the user.

In a case where the personal computer 12 determines in step S37 that the self-position estimation system has not been set for all the waypoints WP, the process returns to step S33 targeting at the next waypoint WP. Then, a similar process is repeated thereafter.

On the other hand, in a case where the personal computer 12 determines in step S37 that the self-position estimation system has been set for all the waypoints WP, the waypoint setting process ends and the process proceeds to step S13 of FIG. 6.

By the waypoint setting process as described above, the mission flight control device 11 can automatically set the self-position estimation system for each of the waypoints WP with priority on high accuracy, and achieve appropriate flight control of the drone 1 so as to fly with higher accuracy.

FIG. 13 is a flowchart describing a waypoint setting process for automatically selecting a waypoint WP with priority on speed. For example, the waypoint setting process illustrated in FIG. 13 can be executed instead of step S12 in FIG. 6.

For example, after the process of step S11 of FIG. 6, in step S41, the user uses the personal computer 12 and specifies the altitude and speed for each of the waypoints WP specified in step S11.

In step S42, the user uses the personal computer 12 and gives an instruction to start the process of automatically setting the self-position estimation system for each of the waypoints WP with priority on speed.

In step S43, for example, the personal computer 12 takes a target for setting the self-position estimation system in order from the waypoint WP that is the start position, and temporarily sets the fastest self-position estimation system for the target waypoint WP.

In step S44, the personal computer 12 determines whether or not the altitude and speed specified in step S41 are within the effective range in which the currently temporarily set self-position estimation system can be used.

In a case where the personal computer 12 determines in step S44 that the altitude and speed are not within the effective range, that is, in a case where the altitude and speed are outside the effective range, the process proceeds to step S45.

In step S45, the personal computer 12 temporarily sets the next fastest self-position estimation system after the currently temporarily set self-position estimation system. Thereafter, the process returns to step S44, and a similar process is repeated thereafter.

On the other hand, in a case where it is determined in step S44 that the altitude and speed are within the effective range, the process proceeds to step S46.

In step S46, the personal computer 12 sets the currently temporarily set self-position estimation system for the target waypoint WP.

In step S47, the personal computer 12 determines whether or not the self-position estimation system has been set for all the waypoints WP specified in step S11 of FIG. 6 by the user.

In a case where the personal computer 12 determines in step S47 that the self-position estimation system has not been set for all the waypoints WP, the process returns to step S43 targeting at the next waypoint WP. Then, a similar process is repeated thereafter.

On the other hand, in a case where the personal computer 12 determines in step S47 that the self-position estimation system has been set for all the waypoints WP, the waypoint setting process ends and the process proceeds to step S13 of FIG. 6.

By the waypoint setting process as described above, the mission flight control device 11 can automatically set the self-position estimation system for each of the waypoints WP with priority on speed, and achieve appropriate flight control of the drone 1 so as to fly at a higher speed.

FIG. 14 is a flowchart describing a waypoint setting process for automatically selecting an altitude for each of the waypoints WP according to speed and specification of the self-position estimation system. For example, the waypoint setting process illustrated in FIG. 12 can be executed instead of step S12 in FIG. 6.

For example, after the processing of step S11 in FIG. 6, in step S51, the user uses the personal computer 12 and specifies the self-position estimation system and speed for each of the waypoints WP specified in step S11.

In step S52, the user uses the personal computer 12 and gives an instruction to start the process of automatically setting the altitude for each of the waypoints WP.

In step S53, for example, the personal computer 12 takes a target for setting the self-position estimation system in order from the waypoint WP that is the start position, and calculates a lowest altitude at which the self-position estimation system is effective for the target waypoint WP.

In step S54, the personal computer 12 determines whether or not the altitude calculated in step S53 is within the effective range when the self-position estimation system set for the target waypoint WP is used.

In a case where the personal computer 12 determines in step S54 that the altitude is not within the effective range, that is, in a case where the altitude is outside the effective range, the process proceeds to step S55.

In step S55, an error display is performed indicating that it is not possible to specify the self-position estimation system and speed specified for the target waypoint WP, and the waypoint setting process is ended. That is, in this case, the process of automatically selecting the altitude for each of the waypoints WP is stopped.

On the other hand, in a case where the personal computer 12 determines in step S54 that the altitude is within the effective range, the process proceeds to step S56.

In step S56, the personal computer 12 sets the altitude calculated in step S53 for the target waypoint WP.

In step S57, the personal computer 12 determines whether or not the altitude has been set for all the waypoints WP specified in step S11 of FIG. 6 by the user.

In a case where the personal computer 12 determines in step S57 that the altitude has not been set for all the waypoint WPs, the process returns to step S53 targeting at the next waypoint WP, and a similar process is repeated thereafter.

On the other hand, in a case where the personal computer 12 determines in step S57 that the altitude has been set for all the waypoints WP, the waypoint setting process ends and the process proceeds to step S13 of FIG. 6.

By the waypoint setting process as described above, the mission flight control device 11 can automatically set the altitude for each of the waypoints WP, and achieve appropriate flight control of the drone 1 so as to fly at a lower altitude.

<Position Display Method on Map when Only Vision is Used>

Figure 15:
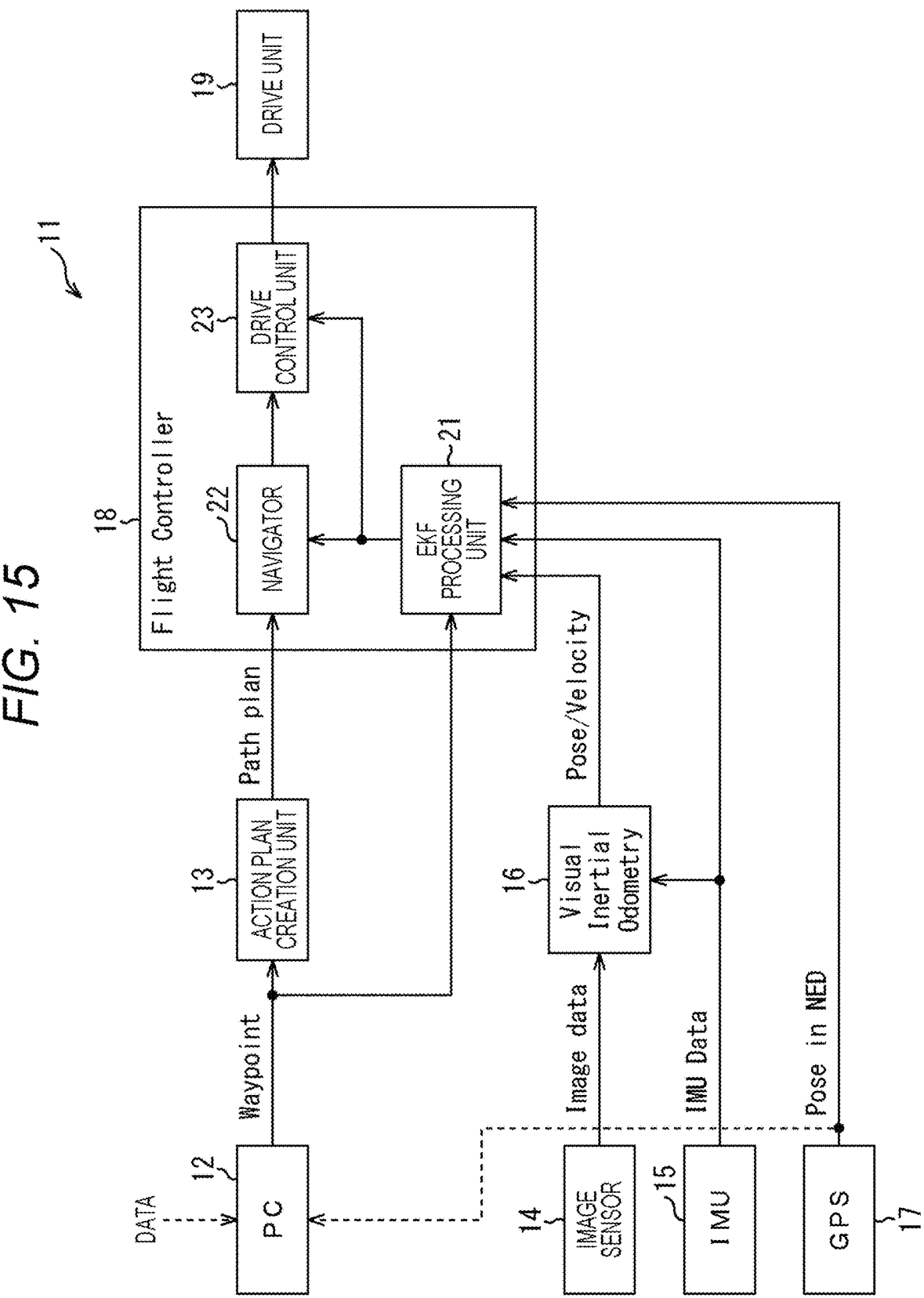
FIG. 15 is a diagram describing alignment in a mission flight control device.

With reference to FIG. 15, a position display method on the map when only vision is used will be described.

For example, in order to display the position of the drone 1 on the map displayed in the map display area 42 of FIG. 4, it is necessary to align the actual position of the drone 1 with the position on the map. Two methods described below are proposed as methods for performing this alignment.

As a first method, a method is used in which the user inputs data to the personal computer 12 as indicated by a broken line arrow heading from the outside to the personal computer 12 in FIG. 15. That is, the user can input data indicating the latitude, longitude, and azimuth of the position where the drone 1 takes off into the personal computer 12 to align the data on the map.

As a second method, a method is used in which data is input from the GPS-based self-position estimation unit 17 to the personal computer 12 as indicated by a broken line arrow heading from the GPS-based self-position estimation unit 17 to the personal computer 12 in FIG. 15. That is, by inputting GPS-based observation information output from the GPS-based self-position estimation unit 17 mounted on the drone 1 to the personal computer 12, data indicating the latitude, longitude, and azimuth of the position where the drone 1 takes off can be aligned on the map.

<Second Configuration Example of Mission Flight Control Device>

A second configuration example of the mission flight control device will be described with reference to FIGS. 16 to 20.

For example, the mission flight control device 11 can customize the mission flight to avoid obstacles on the basis of the positions of the obstacles.

Figure 16:
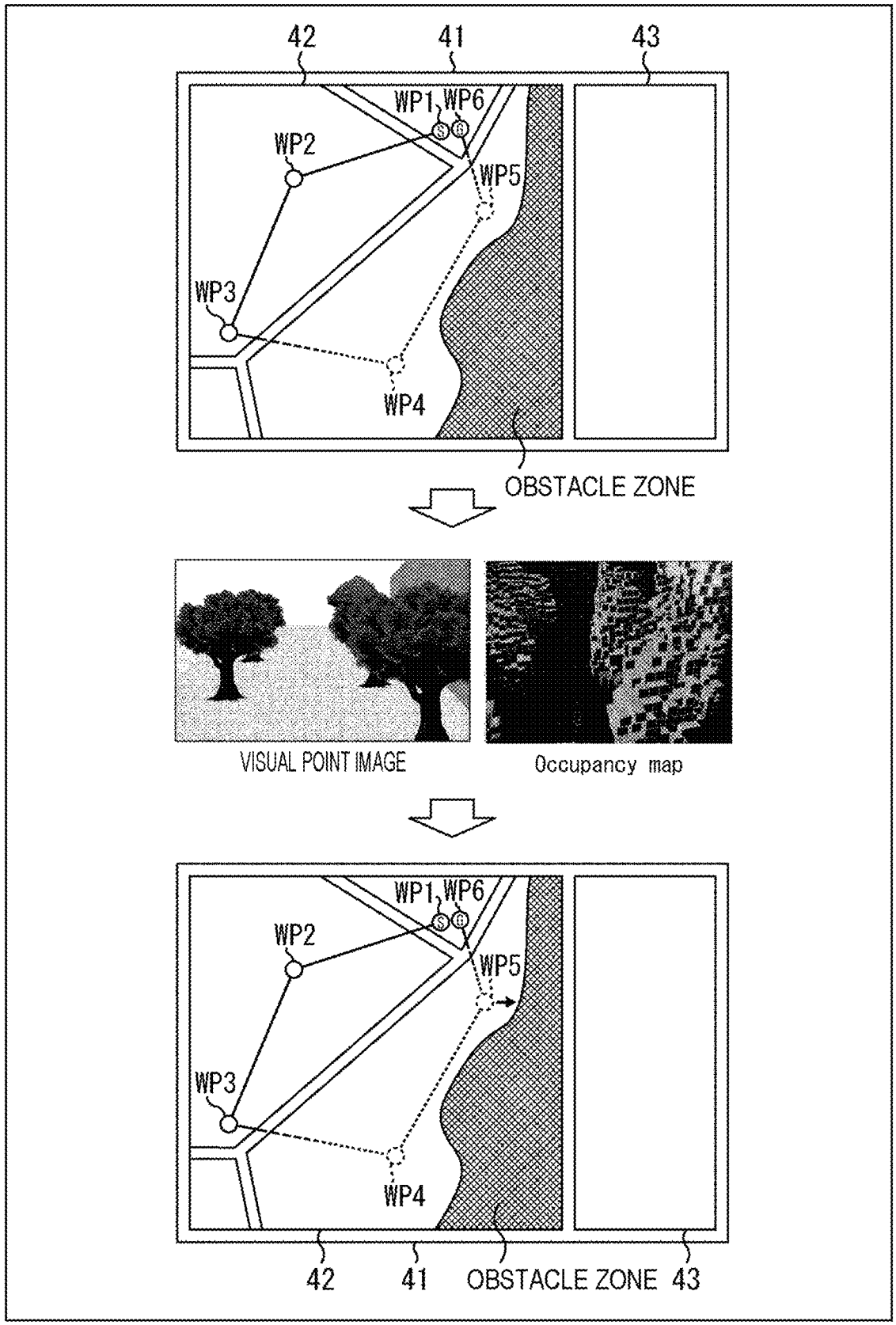
FIG. 16 is a diagram describing a method of customizing a mission flight so as to avoid obstacles on the basis of the positions of the obstacles.

First, as illustrated in the upper part of FIG. 16, waypoints WP are specified on the map displayed in the map display area 42 within a range that does not hit an obstacle. Then, by causing the drone 1 to fly on a route along the waypoints WP, the view point image and the obstacle map as illustrated in the middle of FIG. 16 are acquired.

The view point image is, for example, an image captured by a camera mounted on the drone 1 in the direction of flight. The obstacle map is, for example, a map (Occupancy map) that three-dimensionally represents obstacles based on distance measurement by a vision sensor mounted on the drone 1, and an example of the obstacle map corresponding to the view point image is illustrated in the middle part of FIG. 16.

Thereafter, the user then refers to the obstacle map to fine-adjust the position of a waypoint WP, for example, a waypoint WP5, as illustrated in the lower part of FIG. 16, the route of the mission flight can be customized to approach closer to the obstacle while avoiding the obstacle.

Figure 17:
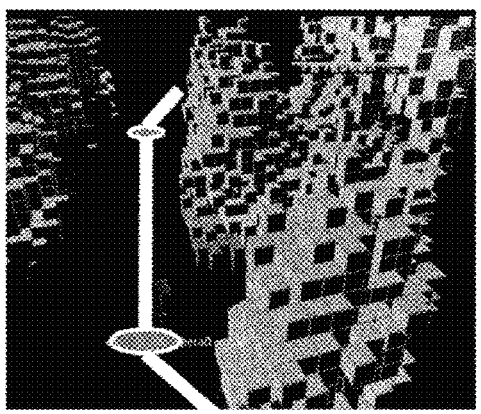
FIG. 17 is a diagram describing fine adjustment of waypoints using an obstacle map.

At this time, for example, as illustrated in FIG. 17, the mission flight control device 11 can display the waypoint WP and the route by superimposing them on the obstacle map represented three-dimensionally. By using such an obstacle map, it is possible to fine-adjust the waypoint WP in more detail, for example, by referring to the altitude of the obstacle. Alternatively, a map representing obstacles at the altitude of the waypoint WP, which is the target of fine adjustment, using contour lines may be used.

Figure 18:
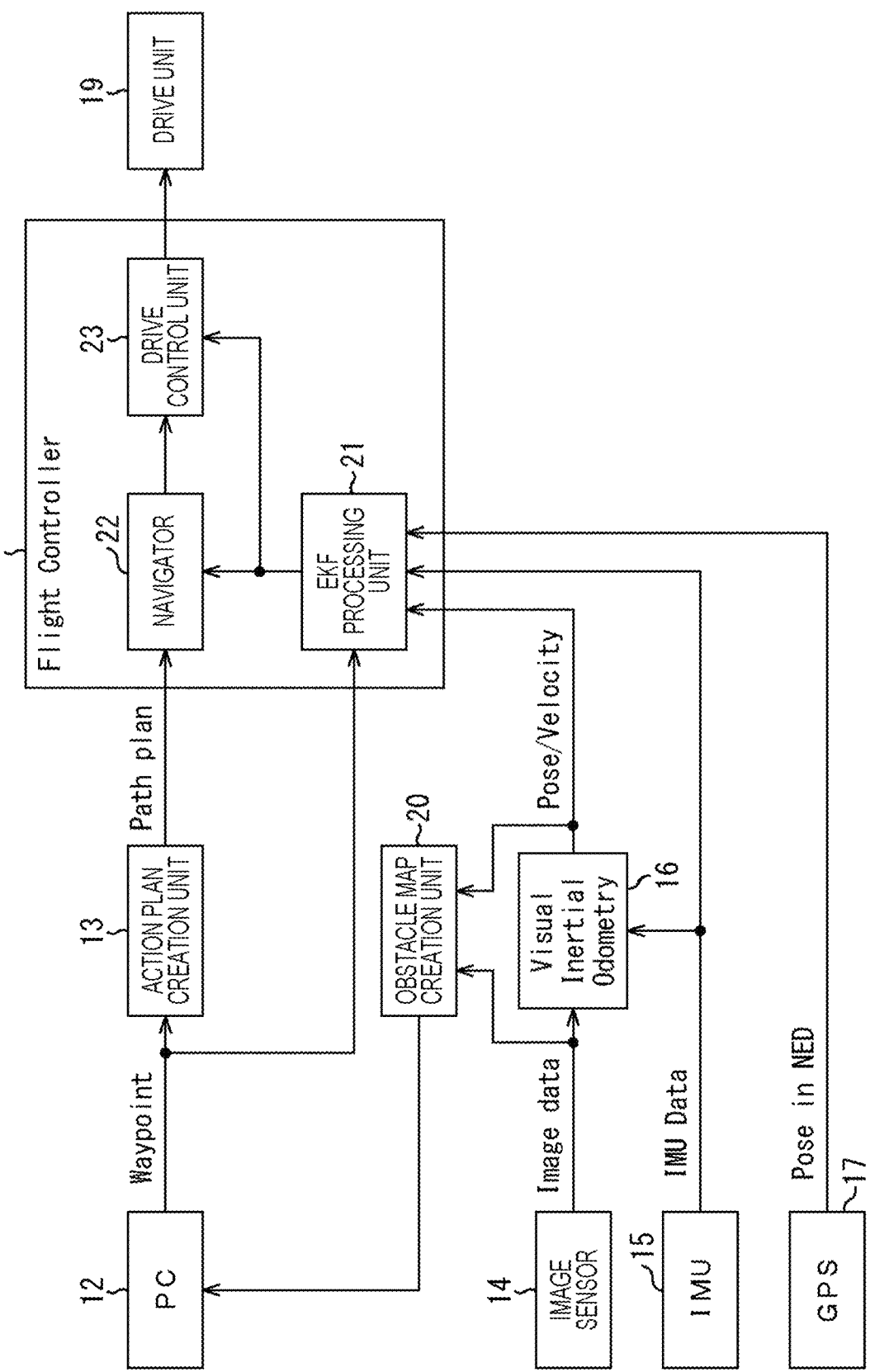
FIG. 18 is a block diagram illustrating a configuration example of a second embodiment of a mission flight control device to which the present technology is applied.

FIG. 18 is a block diagram illustrating a configuration example of a second embodiment of a mission flight control device. Note that in a mission flight control device 11A illustrated in FIG. 18, the same reference numerals are given to configurations common to the mission flight control device 11 of FIG. 2, and detailed description thereof will be omitted.

That is, the mission flight control device 11A is in common with the mission flight control device 11 of FIG. 2 in that it includes a personal computer 12, an action plan creation unit 13, an image sensor 14, an inertial measurement unit 15, a Vision-based self-position estimation unit 16, a GPS-based self-position estimation unit 17, a flight control unit 18, and a drive unit 19.

Then, the mission flight control device 11A has a configuration different from that of the mission flight control device 11 of FIG. 2 in that it includes an obstacle map creation unit 20.

To the obstacle map creation unit 20, image data (Image data) is supplied from the image sensor 14, and Vision-based observation information (Pose/Velocity) is supplied from the Vision-based self-position estimation unit 16. Then, the obstacle map creation unit 20 creates an obstacle map as illustrated in FIG. 16 on the basis of the image data and the Vision-based observation information, and supplies the obstacle map to the personal computer 12.

This allows the user to fine-adjust the waypoint WP using the obstacle maps as illustrated in FIGS. 16 and 17 and customize the mission flight so as to avoid obstacles.

Figure 19:
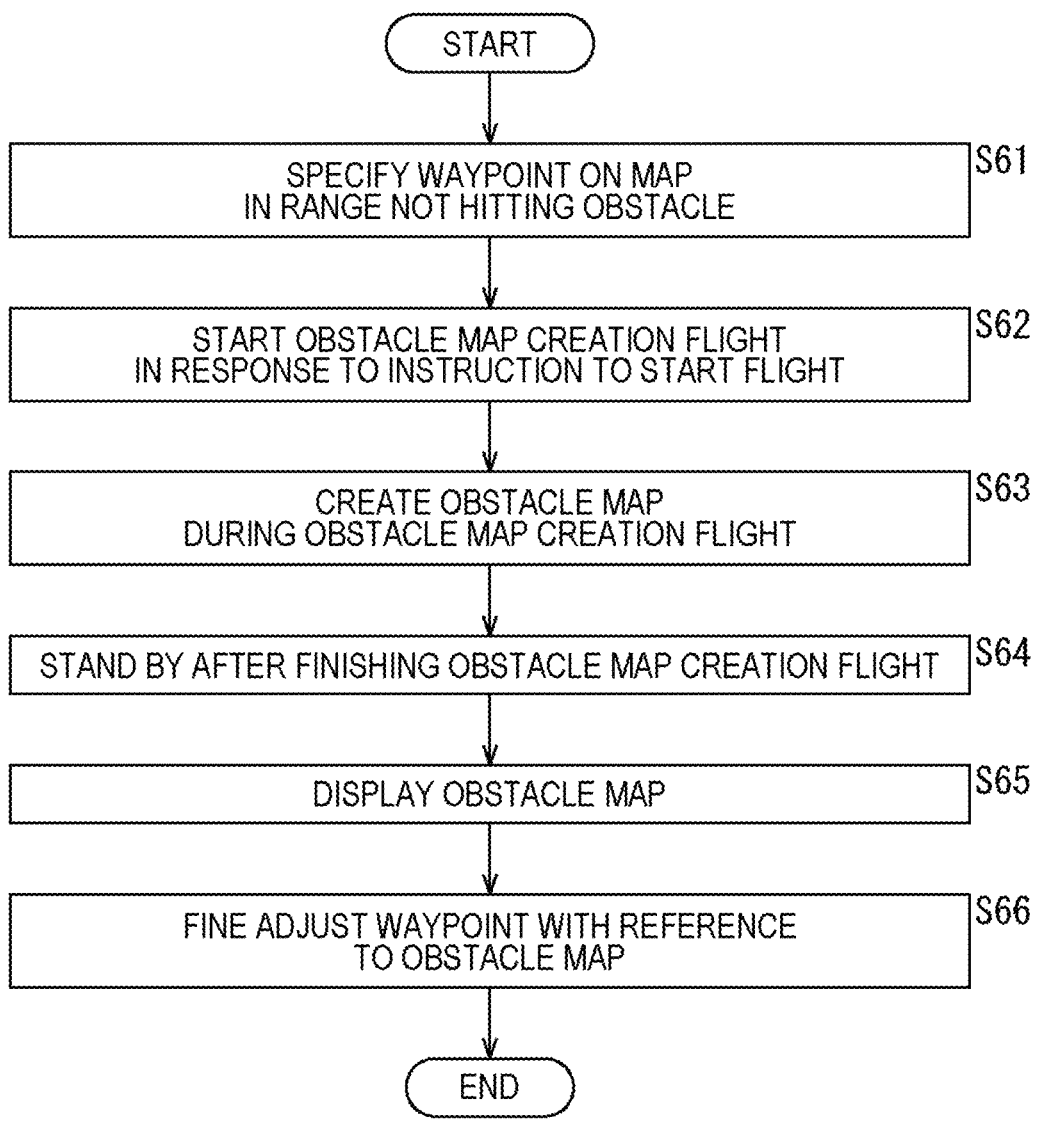
FIG. 19 illustrates a flowchart describing a process of customizing a mission flight.

FIG. 19 illustrates a flowchart describing a process of customizing the mission flight.

In step S61, the user uses the personal computer 12 and specifies waypoints WP within the range where the drone 1 does not hit an obstacle on the map displayed in the map display area 42 of the mission flight setting screen 41.

In step S62, when the user instructs the drone 1 to start the flight, the flight control unit 18 performs flight control in response to the instruction, and the drone 1 starts an obstacle map creation flight for creating the obstacle map.

In step S63, during the obstacle map creation flight of the drone 1, the obstacle map creation unit 20 performs distance measurement on the basis of the image data supplied from the image sensor 14 and the Vision-based observation information supplied from the Vision-based self-position estimation unit 16. Then, the obstacle map creation unit 20 creates an obstacle map representing a range in which an obstacle exists in the route based on the waypoints WP specified in step S61.

In step S64, the flight control unit 18 passes through all the routes based on the waypoints WP specified in step S61, and makes the drone 1 stand by at the start position after the obstacle map creation flight is finished.

In step S65, the personal computer 12 displays the obstacle map created by the obstacle map creation unit 20 on the display unit. At this time, as illustrated in FIG. 16, the obstacle map may be displayed by superimposing an obstacle zone on the map displayed in the map display area 42, or as illustrated in FIG. 17, the obstacle map that is three-dimensionally represented from the view point of the drone 1 may be displayed.

In step S66, the user uses the personal computer 12 to fine-adjust the position of the waypoint WP with reference to the obstacle map.

Thereafter, when the user finishes the fine adjustment of the waypoint WP, the action plan creation unit 13 updates the action plan of the drone 1, a similar process to that described in step S14 and subsequent steps of FIG. 6 is performed, and the flight control based on the waypoints WP that are fine-adjusted is performed.

Visualization of distance measurement accuracy of obstacles will be described with reference to FIG. 20.

Figure 20:
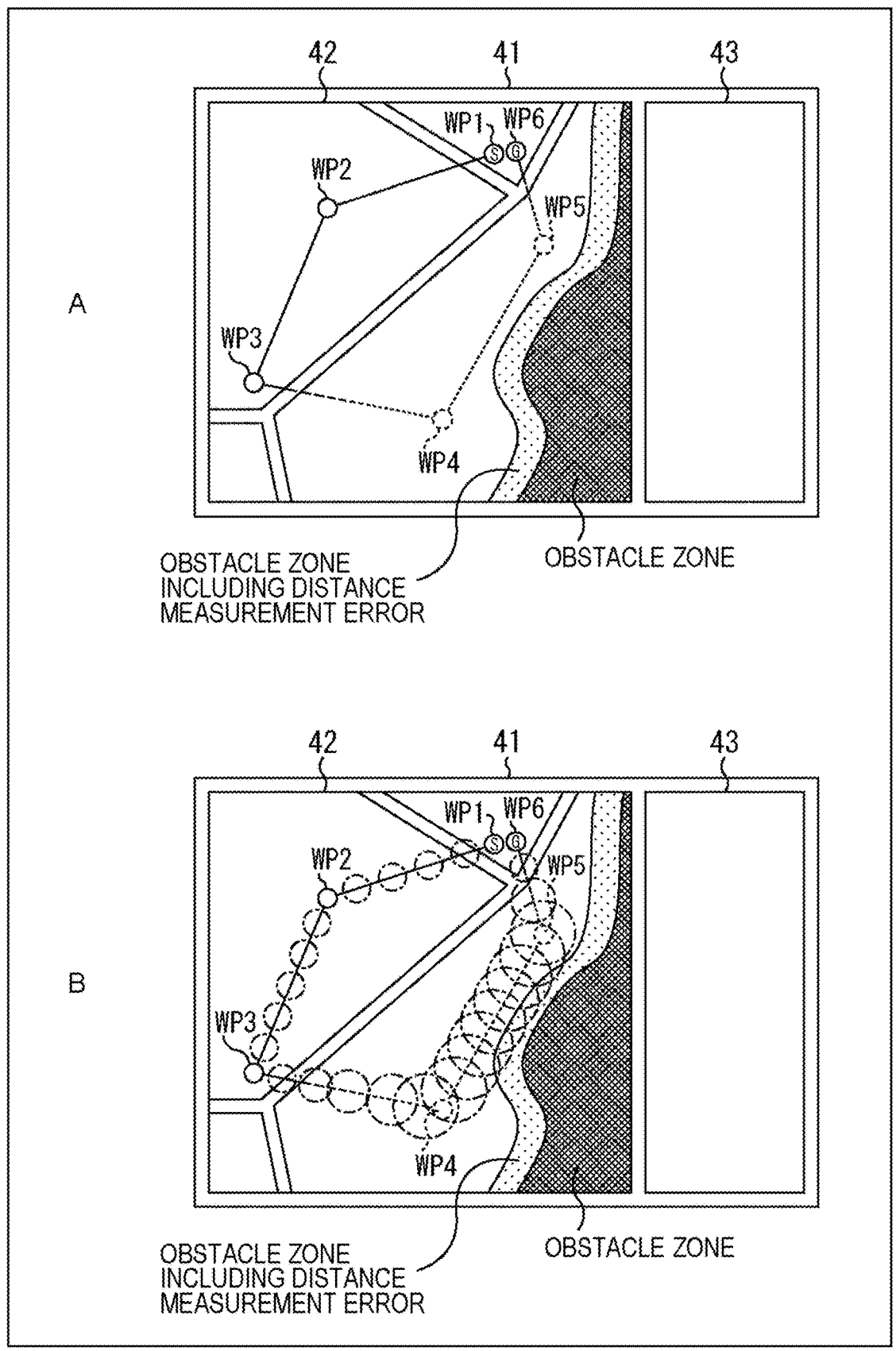
FIG. 20 is a diagram illustrating an example of a user interface that visualizes distance measurement accuracy of an obstacle.

As illustrated at A of FIG. 20, in the map display area 42, according to a distance measurement error of the distance measurement when creating the obstacle map, the obstacle zone including a distance measurement error can be superimposed and displayed on the map with respect to the obstacle.

Moreover, as illustrated at B of FIG. 20, in the map display area 42, an error ellipse representing an error range based on the estimation accuracy of the self-position estimation system can be superimposed and displayed on the map on which the obstacle zone including the distance measurement error is displayed, as in FIG. 9 described above.

For example, in distance measurement of an obstacle using a stereo camera, it is possible to calculate the distance measurement error.

That is, a distance measurement error $\Delta Z_c$ [m] can be calculated in accordance with the following equation (1) by using distance measurement depth $Z_c$ [m], minimum parallax unit $\Delta d$ [pixel], baseline distance b [m], and focus distance f [pixel].

[Equation 1]

$$\Delta Z_c = \frac{Z_c^2}{bf} \cdot \Delta d \qquad (1)$$

For example, on the basis of Equation (1), the larger the distance measurement depth $Z_c$ representing the distance to the obstacle, the larger the distance measurement error $\Delta Z_c$.

<Application of Present Technology>

The present technology can be applied to other than the flight control such that the drone 1 passes through the waypoints WP as described above.

For example, when the drone 1 includes an image sensor, a GPS sensor, and a time-of-flight (ToF) sensor facing downward, it can be applied to switching sensors to be used. For example, the ToF sensor has merits that it can measure in places without textures, dark places, and the like and has higher accuracy than image sensors, but meanwhile has demerits that it can only measure a distance that self-luminous near-infrared light can reach, and it consumes higher power due to the self-luminescence.

Therefore, when the drone 1 is in a landing mode, the ToF sensor facing downward is turned on, and the shape of the vicinity is measured by the ToF sensor in order to search for a flat place where landing is possible. At this time, since the ToF sensor can measure a shape even in a place with few textures, it is possible to search for a flat place more effectively than the image sensor.

On the other hand, when the drone 1 takes off or during a mission flight, the ToF sensor facing downward is turned off. That is, because it is possible to measure only a short distance from the ToF sensor due to characteristics of the ToF sensor, the drone 1 can suppress power consumption by turning off the ToF sensor.

Furthermore, the present technology can be applied to, for example, a robot vacuum cleaner that performs automatic traveling.

For example, the robot vacuum cleaner includes an image sensor and a ToF sensor, and cleaning starts from a power supply port. In this case, when the robot vacuum cleaner is in a cleaning mode to perform cleaning, the ToF sensor is turned on, and the robot vacuum cleaner measures with the ToF sensor and the image sensor to accurately search for obstacles in the self-position and in the vicinity. At the same time, the robot vacuum cleaner creates a map from the power supply port.

On the other hand, when the voltage of the robot vacuum cleaner drops and it enters a power supply port feedback mode, the ToF sensor is turned off. In this case, since the robot vacuum cleaner holds the map from the power supply port, there is no need for additional obstacle detection with the ToF sensor, and it is possible to detect the self-position by the image sensor alone and return to the power supply port. Furthermore, the robot vacuum cleaner can reduce power consumption by turning off the ToF sensor. Then, after the robot vacuum cleaner has moved to the vicinity of the power supply port, the ToF sensor is turned on for highly accurate alignment with the power supply port.

Note that to the sensor specified according to the task in the present technology, in addition to active sensors other than the ToF sensor, for example, Lidar, Sonar, and the like, the present technology can be applied in a similar manner to that for the ToF sensor. Furthermore, as long as it is a robot that automatically travels, in addition to a robot vacuum cleaner, the present technology can also be applied to, for example, a factory transfer robot and the like.

Moreover, in addition to the flight control of the drone 1, the present technology can also be applied to, for example, driving control of an automatically driving vehicle. For example, while the GPS-based self-position estimation unit 17 is used when the automatically driving vehicle travels on a general road, a configuration can be employed that uses the Vision-based self-position estimation unit 16 when the automatically driving vehicle parks in a parking lot, or a configuration may be employed that uses a self-position estimation unit using active sensors such as various radars and ToF sensors.

<Configuration Example of Computer>

Next, the series of processes (information processing method) described above can be performed by hardware or can be performed by software. In a case where the series of processes is performed by software, a program constituting the software is installed in a general-purpose computer or the like.

Figure 21:
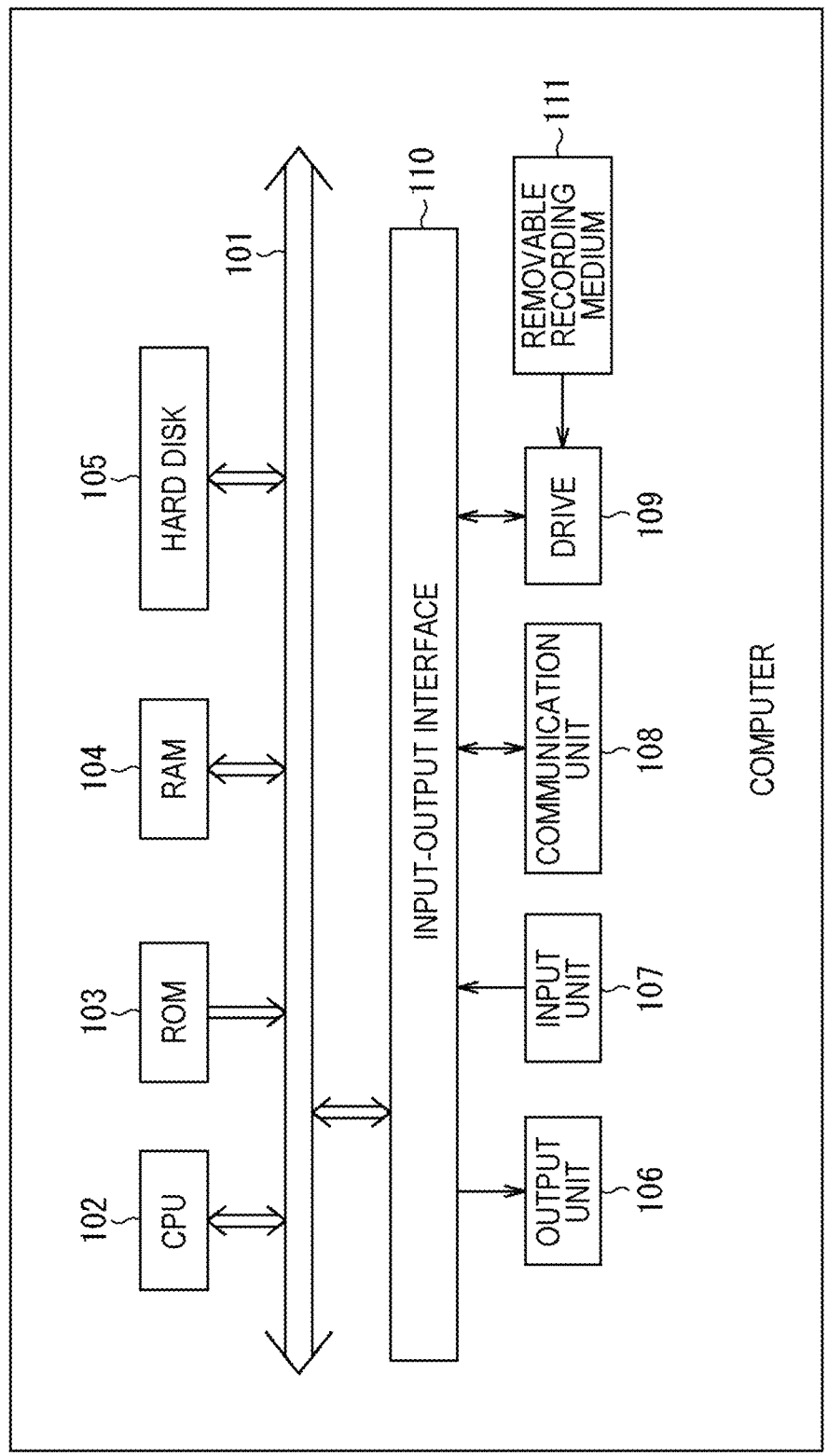
FIG. 21 is a block diagram illustrating a configuration example of one embodiment of a computer to which the present technology is applied.

FIG. 21 is a block diagram illustrating a configuration example of one embodiment of the computer on which the program for executing the above-described series of processing is installed.

The program can be pre-recorded on a hard disk 105 or ROM 103 as a recording medium incorporated in the computer.

Alternatively, the program can be stored (recorded) in a removable recording medium 111 driven by a drive 109. Such a removable recording medium 111 can be provided as what is called package software. Here, examples of the removable recording medium 111 include, for example, a flexible disk, a compact disc read only memory (CD-ROM), a magneto optical (MO) disk, a digital versatile disc (DVD), a magnetic disk, a semiconductor memory, and the like.

Note that in addition to installing the program on the computer from the removable recording medium 111 as described above, the program can be downloaded to the computer via a communication network or a broadcasting network and installed on the incorporated hard disk 105.

That is, for example, the program can be transferred to the computer wirelessly from a download site via an artificial satellite for digital satellite broadcasting, or transferred to the computer by wire via a network such as a local area network (LAN) or the Internet.

The computer has an incorporated central processing unit (CPU) 102, and an input-output interface 110 is connected to the CPU 102 via a bus 101.

If a command is input by a user through the input-output interface 110 by operating an input unit 107 or the like, the CPU 102 executes the program stored in the read only memory (ROM) 103 accordingly. Alternatively, the CPU 102 loads the program stored in the hard disk 105 into a random access memory (RAM) 104 and executes the program.

Thus, the CPU 102 performs the processing according to the above-described flowchart or the processing performed according to the above-described configuration of the block diagram. Then, the CPU 102 outputs a processing result thereof from an output unit 106 or sends the processing result from a communication unit 108 if necessary via the input-output interface 110 for example, and further causes recording of the processing result on the hard disk 105, or the like.

Note that the input unit 107 includes a keyboard, a mouse, a microphone, and the like. Furthermore, the output unit 106 includes a liquid crystal display (LCD), a speaker, and the like.

Here, in the present description, the processing performed by the computer according to the program does not necessarily have to be performed in time series in the order described as the flowchart. That is, the processing performed by the computer according to the program also includes processing that is executed in parallel or individually (for example, parallel processing or object processing).

Furthermore, the program may be processed by one computer (processor) or may be processed in a distributed manner by a plurality of computers. Moreover, the program may be transferred to a distant computer and executed.

Moreover, in the present description, a system means a set of a plurality of components (devices, modules (parts), and the like), and it does not matter whether or not all components are in the same housing. Therefore, both of a plurality of devices housed in separate housings and connected via a network and a single device in which a plurality of modules is housed in one housing are systems.

Further, for example, a configuration described as one device (or processing unit) may be divided and configured as a plurality of devices (or processing units). Conversely, configurations described above as a plurality of devices (or processing units) may be combined and configured as one device (or processing unit). Furthermore, a configuration other than those described above may of course be added to the configuration of each device (or each processing unit). Moreover, if the configuration and operation of the entire system are substantially the same, a part of the configuration of a certain device (or processing unit) may be included in the configuration of another device (or another processing unit).

Furthermore, for example, the present technology can take a cloud computing configuration in which one function is processed in a shared and collaborative manner by a plurality of devices via a network.

Furthermore, for example, the above-described program can be executed by an arbitrary device. In that case, it is sufficient if the device has necessary functions (functional blocks and the like) and can acquire necessary information.

Furthermore, for example, respective steps described in the above-described flowcharts can be executed by one device or can be executed in a shared manner by a plurality of devices. Moreover, in a case where a plurality of processes is included in one step, the plurality of processes included in the one step can be executed in a shared manner by a plurality of devices in addition to being executed by one device. In other words, a plurality of processes included in one step can be executed as processes of a plurality of steps. Conversely, a process described as a plurality of steps can be collectively executed as one step.

Note that the program executed by the computer may be configured so that the processes in the steps for describing the program are executed in chronological order according to the order described in the present description, or may be executed in parallel or individually at a necessary timing such as when a call is made. That is, as long as no contradiction occurs, the processes in the respective steps may be executed in an order different from the above-described orders. Moreover, the processes in steps for describing this program may be executed in parallel with processes in another program, or may be executed in combination with processes in another program.

Note that the plurality of present technologies which has been described in the present description can each be implemented independently as a single unit as long as no contradiction occurs. Of course, any plurality of the present technologies can also be used and implemented in combination. For example, part or all of the present technologies described in any of the embodiments can be implemented in combination with part or all of the present technologies described in other embodiments. Furthermore, part or all of any of the above-described present technologies can be implemented by using together with another technology that is not described above.

<Example of combinations of configurations

Note that the present technology can have configurations as follows.

(1)

An action control device including:

a state specification unit that selects, on the basis of indexes, a self-position estimation unit used to estimate a position of a mobile object from a plurality of the self-position estimation units which is different in estimation accuracy, and obtains a state of the mobile object; and an action control unit that controls an action of the mobile object according to an action plan created in advance on the basis of the state of the mobile object.

(2)

The action control device according to (1) above, in which the indexes are position information or area information acquired from a global positioning system (GPS).

(3)

The action control device according to (1) or (2) above, in which the state specification unit includes:

a nearest neighbor index selection unit that selects, among indexes for when the mobile object acts, the index to be a nearest neighbor accompanying an action of the mobile object;

an observation information selection unit that selects, from among a plurality of pieces of observation information output as a result of estimation of a position of the mobile object by each of the plurality of the self-position estimation units, the observation information output from the self-position estimation unit that is specified on the basis of the index selected by the nearest neighbor index selection unit; and a state update unit that obtains a latest state of the mobile object on the basis of the observation information selected by the observation information selection unit.

(4)

The action control device according to any one of (1) to (3) above, further including a specification unit that specifies the self-position estimation unit selected by the state specification unit for each of the indexes.

(5)

The action control device according to (4) above, in which the specification unit specifies the self-position estimation unit for each predetermined one of the indexes according to a priority for when the self-position estimation unit estimates a self-position of the mobile object for a predetermined one of the indexes.

(6)

The action control device according to (5) above, in which the specification unit specifies the self-position estimation unit capable of obtaining highest estimation accuracy within a range of an effective range of altitude and speed at which the self-position estimation unit is capable of functioning effectively in a case where the priority is estimation accuracy.

(7)

The action control device according to (5) above, in which the specification unit specifies the self-position estimation unit capable of obtaining fastest moving speed within an effective range of altitude and speed at which the self-position estimation unit is capable of functioning effectively in a case where the priority is moving speed.

(8)

The action control device according to (4) above, in which in a case where the self-position estimation unit and speed of the mobile object for a predetermined one of the indexes are specified, the specification unit specifies a lowest altitude at which the specified self-position estimation unit effectively functions for each predetermined one of the indexes.

(9)

The action control device according to (4) above, in which in the specification unit, a user giving an instruction on creation of the action plan specifies a plurality of the indexes, and specifies the self-position estimation unit for each of the indexes.

(10)

The action control device according to (9) above, further including a display unit that visualizes the self-position estimation unit specified for each of the indexes by the specification unit and visualizes and displays the self-position estimation unit used for each of routes according to the indexes.

(11)

The action control device according to (10) above, in which on the basis of the index for which a predetermined one of the self-position estimation units is specified, the display unit displays an effective range of altitude and speed of the mobile object in which the self-position estimation unit is capable of functioning effectively, and visualizes and displays that it is not specifiable outside the effective range.

(12)

The action control device according to (10) above, in which the display unit visualizes and displays estimation accuracy of the self-position estimation unit used in the routes along each of the routes.

(13)

The action control device according to (10) above, in which in response to specification of altitude and speed of the mobile object, the display unit visualizes and displays that the self-position estimation unit that is not capable of functioning effectively at the altitude and the speed is not specifiable.

(14)

The action control device according to (10) above, further including an obstacle map creation unit that creates an obstacle map representing a range in which an obstacle exists near the routes on the basis of distance measurement performed by the mobile object while moving according to the action plan, in which the display unit displays the obstacle map by superimposing on a map representing an area in which the mobile object is moved, and in the specification unit, a position of the index on the map is fine-adjusted and respecified by the user.

(15)

The action control device according to (14) above, in which the display unit superimposes and displays on the map an error range with respect to the range in which the obstacle exists according to a distance measurement error of the distance measurement when the obstacle map is created.

(16)

The action control device according to (15) above, in which the display unit superimposes and displays on the map an error ellipse representing an error range based on estimation accuracy of the self-position estimation unit.

(17)

An action control method including, by an action control device that controls action of a mobile object:

selecting, on the basis of indexes, a self-position estimation unit used to estimate a position of the mobile object from a plurality of the self-position estimation units which is different in estimation accuracy, and obtaining a state of the mobile object; and controlling an action of the mobile object according to an action plan created in advance on the basis of the state of the mobile object.

(18)

A program for causing a computer of an action control device that controls action of a mobile object to execute information processing including:

selecting, on the basis of indexes, a self-position estimation unit used to estimate a position of the mobile object from a plurality of the self-position estimation units which is different in estimation accuracy, and obtaining a state of the mobile object; and controlling an action of the mobile object according to an action plan created in advance on the basis of the state of the mobile object.

Note that the present embodiments are not limited to the above-described embodiments, and various modifications are possible without departing from the gist of the present disclosure. Furthermore, the effects described in the present description are merely examples and are not limited, and other effects may be provided.

REFERENCE SIGNS LIST

11 Mission flight control device
12 Personal computer
13 Action plan creation unit
14 Image sensor
15 Inertial measurement unit
16 Vision-based self-position estimation unit
17 GPS-based self-position estimation unit
18 Flight control unit
19 Drive unit
20 Obstacle map creation unit
21 EKF processing unit
22 Navigator
23 Drive control unit
31 EKF state prediction unit
32 Nearest neighbor waypoint selection unit
33 Observation information selection unit
34 EKF state update unit
41 Mission flight setting screen
42 Map display area
43 Instruction GUI display area

The invention claimed is:

1. An action control device, comprising:
a plurality of self-position estimation systems, wherein the plurality of self-position estimation systems include a Vision-based self-position estimation system and a global positioning system (GPS)-based self-position estimation system;
processing circuitry configured to
select, for each of a plurality of waypoints, a self-position estimation system from the plurality of self-position estimation systems used to estimate a position of a mobile object, each of the plurality of self-position estimation systems having a different estimation accuracy,
obtain a state of the mobile object based on an inertial measurement of the mobile object, vision-based observation information from the Vision-based self-position estimation system, and GPS-based observation information from the GPS-based self-position estimation system,
specify the selected self-position estimation system for each of the plurality of waypoints,
in a case that the self-position estimation system and speed of the mobile object for a predetermined one of the plurality of waypoints are specified, specify a lowest altitude at which the specified self-position estimation system effectively functions for the predetermined one of the plurality of waypoints, and
control an action of the mobile object according to an action plan created in advance based on the state of the mobile object.

2. The action control device according to claim 1, wherein the waypoints indexes are position information or area information acquired from a global positioning system (GPS).

3. The action control device according to claim 1, wherein the processing circuitry is further configured to
select, among waypoints for when the mobile object acts, the waypoint to be a nearest neighbor accompanying an action of the mobile object;
select, from among a plurality of pieces of observation information output as a result of estimation of a position of the mobile object by each of the plurality of the self-position estimation systems, the observation information output from the self-position estimation system that is specified on a basis of the selected waypoint; and obtain a latest state of the mobile object on a basis of the selected observation information.

4. The action control device according to claim 1, wherein the processing circuitry is further configured to specify the self-position estimation system for each predetermined one of the waypoints according to a priority for when the self-position estimation system estimates a self-position of the mobile object for a predetermined one of the waypoints.

5. The action control device according to claim 4, wherein the processing circuitry is further configured to specify the self-position estimation system capable of obtaining highest estimation accuracy within a range of an effective range of altitude and speed at which the self-position estimation system is capable of functioning effectively in a case where the priority is estimation accuracy.

6. The action control device according to claim 4, wherein the processing circuitry is further configured to specify the self-position estimation system capable of obtaining fastest moving speed within an effective range of altitude and speed at which the self-position estimation system is capable of functioning effectively in a case where the priority is moving speed.

7. The action control device according to claim 1, wherein the processing circuitry is further configured to specify, by a user giving an instruction on creation of the action plan, a plurality of the waypoints, and specify the self-position estimation system for each of the waypoints.

8. The action control device according to claim 7, wherein the processing circuitry is further configured to display the self-position estimation system specified for each of the waypoints and display the self-position estimation system used for each route according to the waypoints.

9. The action control device according to claim 8, wherein on a basis of the waypoint for which a predetermined one of the self-position estimation systems is specified, the processing circuitry is further configured to display an effective range of altitude and speed of the mobile object in which the self-position estimation system is capable of functioning effectively, and display that it is not specifiable outside the effective range.

10. The action control device according to claim 8, wherein the processing circuitry is further configured to display estimation accuracy of the self-position estimation system used in the routes along each of the routes.

11. The action control device according to claim 8, wherein the processing circuitry is further configured to in response to specification of altitude and speed of the mobile object, display the self-position estimation system that is not capable of functioning effectively at the altitude and the speed is not specifiable.

12. The action control device according to claim 8, wherein the processing circuitry is further configured to create an obstacle map representing a range in which an obstacle exists near the routes on a basis of a distance measurement performed by the mobile object while moving according to the action plan, display the obstacle map by superimposing the obstacle on a map representing an area in which the mobile object is moved, and receive, as input from the user, an adjustment of a position of the waypoints on the map.

13. The action control device according to claim 12, wherein the processing circuitry is further configured to superimpose and display on the map an error range with respect to the range in which the obstacle exists according to a distance measurement error of the distance measurement when the obstacle map is created.

14. The action control device according to claim 13, wherein the processing circuitry is further configured to superimpose and display on the map an error ellipse representing an error range based on estimation accuracy of the self-position estimation system.

15. An action control method comprising, by an action control device that controls action of a mobile object:

selecting, for each of a plurality of waypoints, a self-position estimation system from the plurality of self-position estimation systems used to estimate a position of a mobile object, each of the plurality of self-position estimation systems having a different estimation accuracy;

obtaining a state of the mobile object based on an inertial measurement of the mobile object, vision-based observation information from a Vision-based self-position estimation system, and GPS-based observation information from a GPS-based self-position estimation system;

specifying the selected self-position estimation system for each of the plurality of waypoints;

in a case that the self-position estimation system and speed of the mobile object for a predetermined one of the plurality of waypoints are specified, specifying a lowest altitude at which the specified self-position estimation system effectively functions for the predetermined one of the plurality of waypoints; and controlling an action of the mobile object according to an action plan created in advance based on the state of the mobile object.

16. A non-transitory storage device having stored therein a program for causing a computer of an action control device that controls action of a mobile object to execute information processing comprising:

selecting, for each of a plurality of waypoints, a self-position estimation system from the plurality of self-position estimation systems used to estimate a position of a mobile object, each of the plurality of self-position estimation systems having a different estimation accuracy;

obtaining a state of the mobile object based on an inertial measurement of the mobile object, vision-based observation information from a Vision-based self-position estimation system, and GPS-based observation information from a GPS-based self-position estimation system;

specifying the selected self-position estimation system for each of the plurality of waypoints;

in a case that the self-position estimation system and speed of the mobile object for a predetermined one of the plurality of waypoints are specified, specifying a lowest altitude at which the specified self-position estimation system effectively functions for the predetermined one of the plurality of waypoints; and controlling an action of the mobile object according to an action plan created in advance based on the state of the mobile object.

* * * * *